US008376216B2

(12) United States Patent
Morita

(10) Patent No.: US 8,376,216 B2
(45) Date of Patent: Feb. 19, 2013

(54) READER DEVICE WITH READING TIME COUNTING UNIT

(75) Inventor: Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 221 days.

(21) Appl. No.: 11/816,701

(22) PCT Filed: Feb. 24, 2006

(86) PCT No.: PCT/JP2006/303480
§ 371 (c)(1),
(2), (4) Date: Aug. 20, 2007

(87) PCT Pub. No.: WO2006/090855
PCT Pub. Date: Aug. 31, 2006

(65) Prior Publication Data
US 2009/0014511 A1    Jan. 15, 2009

(30) Foreign Application Priority Data

Feb. 25, 2005 (JP) .................................. 2005-052098
Oct. 28, 2005 (JP) .................................. 2005-314913

(51) Int. Cl.
G06F 17/00 (2006.01)
G06K 7/10 (2006.01)
G07B 15/02 (2011.01)
H04W 24/00 (2009.01)
G08B 1/08 (2006.01)
G08B 23/00 (2006.01)

(52) U.S. Cl. .................. 235/375; 235/472.01; 235/384; 455/456.1; 340/539.11; 340/539.13; 340/573.1

(58) Field of Classification Search .................. 235/383, 235/462.45, 376, 377, 384, 385, 462.46, 235/462.49, 472.01–472.03, 382, 375, 380, 235/451, 492; 705/32, 22, 28; 356/572.1, 356/573.1, 573.4, 539.1, 539.11, 539.13, 356/825.49; 340/572.1, 573.1, 573.4, 539.1, 340/539.11, 539.13, 825.49, 8.1, 539.32, 340/989, 994, 539.14; 455/456.1
See application file for complete search history.

(56) References Cited

U.S. PATENT DOCUMENTS 3,593,008 A * 7/1971 De Witt et al. .................. 705/11
3,906,203 A * 9/1975 Butulis .......................... 235/437
4,335,301 A * 6/1982 Palmer et al. ............. 235/462.25
4,373,133 A * 2/1983 Clyne et al. .................... 235/383
5,187,356 A * 2/1993 Chadima et al. ......... 235/462.32

(Continued)

FOREIGN PATENT DOCUMENTS

JP    2000205888 A  *  7/2000
JP    2003-296875       10/2003

(Continued)

Primary Examiner — Michael G Lee
Assistant Examiner — Suezu Ellis
(74) Attorney, Agent, or Firm — DLA Piper LLP (US)

(57) ABSTRACT

To improve convenience of a data carrier system, a cellular phone (30) which is carried by a user and includes an RFID communication unit (36) reading identification information of an RFID from the RFID in the vicinity in a non-contact state contains a user correlation unit (311) counting the number of times of reading with respect to identification information which have been read, selecting at least one carrier identification information from the identification information which have been read, and correlating the at least one carrier identification information with the user.

9 Claims, 15 Drawing Sheets

U.S. PATENT DOCUMENTS

| | | | |
|---|---|---|---|
| 5,698,837 A * | 12/1997 | Furuta | 235/492 |
| 5,770,848 A * | 6/1998 | Oizumi et al. | 235/462.14 |
| 5,877,485 A * | 3/1999 | Swartz | 235/383 |
| 6,105,004 A * | 8/2000 | Halperin et al. | 705/28 |
| 6,693,544 B1 * | 2/2004 | Hebbecker | 340/573.1 |
| 7,123,126 B2 * | 10/2006 | Tanaka et al. | 340/5.2 |
| 7,135,975 B2 * | 11/2006 | Hoshina et al. | 340/572.1 |
| 7,477,154 B2 * | 1/2009 | Braunstein | 340/573.1 |
| 7,522,926 B2 * | 4/2009 | Chu et al. | 455/456.1 |
| 7,535,353 B2 * | 5/2009 | Hirai et al. | 340/541 |
| 2002/0004740 A1 * | 1/2002 | Shotey et al. | 705/10 |
| 2003/0095032 A1 * | 5/2003 | Hoshino et al. | 340/5.92 |
| 2005/0017072 A1 | 1/2005 | Tomita | 234/451 |
| 2005/0099295 A1 * | 5/2005 | Sakamoto et al. | 340/540 |
| 2005/0131745 A1 * | 6/2005 | Keller et al. | 705/7 |
| 2005/0245271 A1 * | 11/2005 | Vesuna | 455/456.1 |
| 2006/0149640 A1 * | 7/2006 | Gordon et al. | 705/26 |
| 2007/0008129 A1 * | 1/2007 | Soliman | 340/572.1 |
| 2007/0229265 A1 * | 10/2007 | Takeuchi et al. | 340/572.1 |
| 2008/0220720 A1 * | 9/2008 | Ashley et al. | 455/41.2 |
| 2009/0206151 A1 * | 8/2009 | Morita | 235/375 |

FOREIGN PATENT DOCUMENTS

| | | |
|---|---|---|
| JP | 2004-191309 | 7/2004 |
| JP | 2004-206590 | 7/2004 |
| JP | 2004-362489 | 12/2004 |
| JP | 2005-009891 | 1/2005 |
| JP | 2005-037141 | 2/2005 |
| JP | 2007122489 A * | 5/2007 |

* cited by examiner

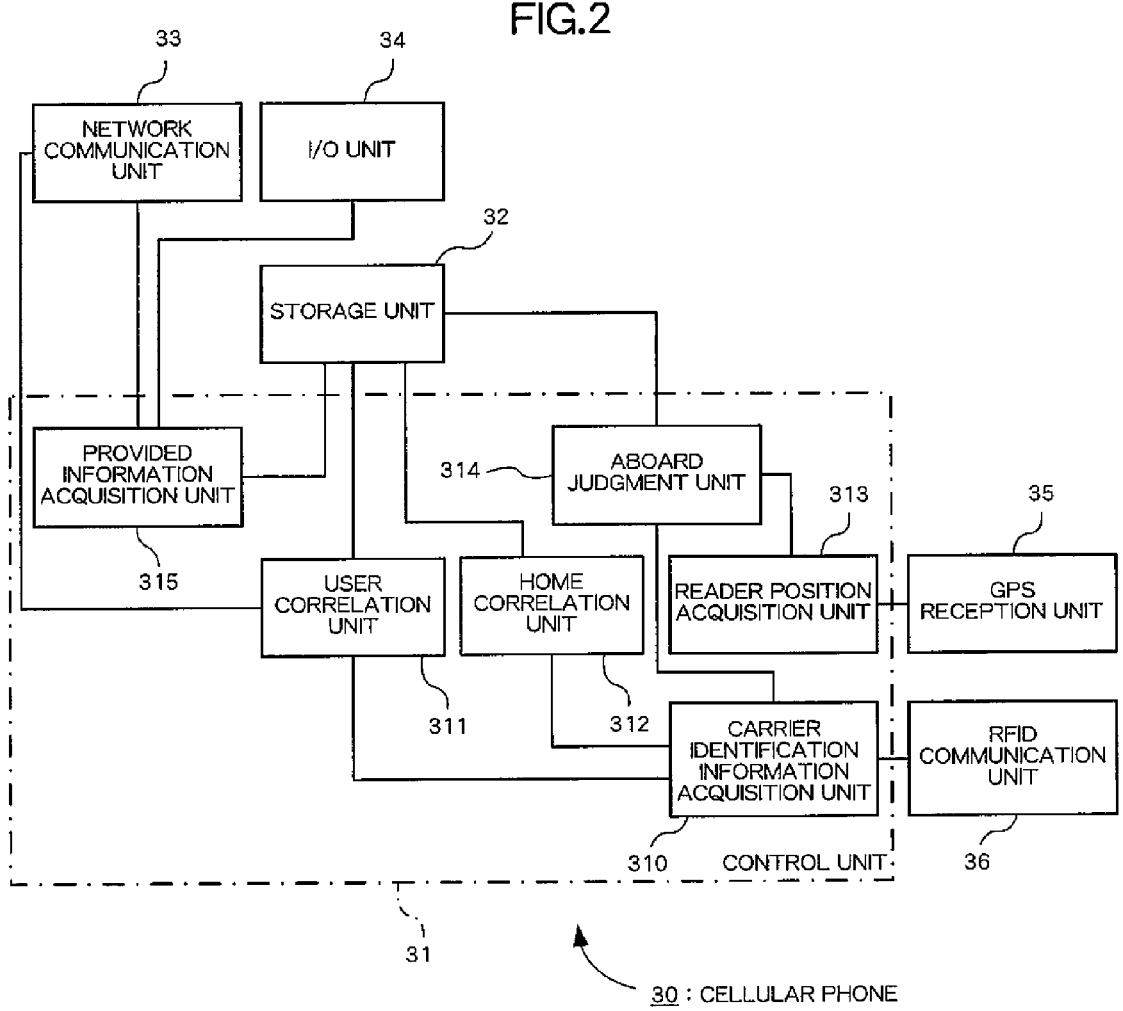

FIG.4

| CARRIER IDENTIFICATION INFORMATION | NUMBER OF SUCCESSIVE ACQUISITION TIMES DURING MOVING |
|---|---|
| ID-A | 3 |
| ID-B | 0 |
| ... | ... |

FIG.5

| CARRIER IDENTIFICATION INFORMATION | NUMBER OF SUCCESSIVE MOVING ID ACQUISITION TIMES | MAXIMUM SPEED INFORMATION |
|---|---|---|
| ID-C | 3 | 60km/h |
| ID-D | 8 | 20km/h |
| ... | ... | ... |

FIG.6

| CARRIER IDENTIFICATION INFORMATION | NUMBER OF ACQUISITION TIMES |
|---|---|
| ID-E | 1 |
| ID-G | 3 |
| ID-H | 103 |
| ... | ... |

FIG.7

| CARRIER IDENTIFICATION INFORMATION |
|---|
| ID-A |
| ID-E |
| ID-G |
| ID-H |
| ... |

```
DATE: DECEMBER 10, 2005
TIME : 13 : 30
CONTENTS : MEETING
PLACE : COMPANY→STATION→DESTINATION C
```

READER DEVICE WITH READING TIME COUNTING UNIT

TECHNICAL FIELD

The present invention relates to a reader device, an information providing system, and a provided information acquisition method.

BACKGROUND ART

In recent years, a data carrier system is attracting attention in which a data carrier (e.g., radio frequency identification (RFID)) capable of storing a certain amount of data is carried by a user or mounted to an object, and a reader device reads identification information of the data carrier, whereby a service of identifying an object and other services and information can be provided.

Patent Document 1 discloses an example of an information providing system using the data carrier system as described above. In the information providing system disclosed in Patent Document 1, an information providing device stores in advance carrier identification information for identifying a data carrier and user identification information for identifying a user in correlation with each other. The information providing device reads the carrier identification information of the data carrier when the data carrier comes in the vicinity of the information providing device, and provides information based on the user identification information stored in correlation with the read carrier identification information.

In addition, Patent Document 2 discloses a navigation service using a position at which a data carrier is set. Hereinafter, a description will be given of an example of this navigation service.

First, data carriers each storing location information indicating a location at which a data carrier is attached are attached to various places in town (e.g., bus stops and stores). When a user walks around the town while carrying a reader device (e.g., cellular phone equipped with a data carrier reading function), the reader device acquires the location information from the data carrier located within a radio wave-reachable range.

The reader device that has acquired the location information acquires provided information (e.g., bus approach information and information on products on sale) corresponding to a location indicated by the acquired location information. Specifically, information is acquired by acquiring information stored in the reader device in advance or by connecting to the network each time. Thus the reader device acquires the provided information corresponding to the location at which the data carrier is attached, to thereby provide the acquired provided information to the user.

[Patent Document 1] JP 2004-362489 A
[Patent Document 2] JP2004-206590A (paragraph No. 0004)

DISCLOSURE OF THE INVENTION

Problems to be Solved by the Invention

However, the conventional data carrier system has had problems in terms of convenience.

Specifically, in the conventional information providing system described above, it is necessary to manually perform a complex registration operation of correlating the user identification information with the carrier identification information of the data carrier in advance.

Further, in the navigation service described above, the reader device acquires provided information regarding the location at which the data carrier is set after the reader device acquires location information stored in the data carrier. Thus, there has been cases where the provided information is being acquired when the user wishes to receive provision of the provided information.

Therefore, an object of the present invention is to provide a reader device, an information providing system, and a provided information acquisition method capable of enhancing convenience of a data carrier system. Further, another object of the present invention is to provide a reader device and an information providing system capable of automating a registration operation of correlating a user with carrier identification information of a data carrier. Further, still another object of the present invention is to provide a reader device and a provided information acquisition method with which it is possible to predict movement of a user and acquire provided information in advance.

Means for Solving the Problems

A reader device according to the present invention for resolving the these problems which is carried by a user and includes a carrier identification information reader unit reading carrier identification information for identifying a data carrier in a non-contact state from the data carrier, includes a reading time counting unit counting a number of times of reading by the carrier identification information reader unit with respect to the carrier identification information read by the carrier identification information reader unit; and a user correlation unit selecting at least one carrier identification information from carrier identification information read by the carrier identification information reader unit according to the number of times counted by the reading time counting unit, and correlating the selected carrier identification information with the user.

According to the present invention, by the reader device reading the carrier identification information from a specific data carrier for a number of times while being carried by the user, the carrier identification information becomes correlated with the user. Thus, it becomes possible to automate the registration operation for correlating the user with the carrier identification information of the RFID data carrier. As a result, convenience of the data carrier system is improved.

Further, the reader device described above may further include a storage unit storing at least a part of the data carriers as a data carrier to be transported or worn, wherein the user correlation unit selects at least one carrier identification information from the carrier identification information read by the carrier identification information reader unit and used for identifying the data carrier stored in the storage unit as the data carrier to be transported or worn according to the number of times counted by the reading time counting unit.

Further, the reader device described above may further include an information acquisition unit acquiring information selected based on the carrier identification information correlated with the user by the user correlation unit and an information output unit outputting the information acquired by the information acquisition unit, or may further include an information transmission unit transmitting the carrier identification information correlated with the user by the user correlation unit to another device.

Thus, information can be provided based on the carrier identification information correlated with the user. Specifically, because the reader device can acquire and output the information selected based on the carrier identification information correlated with the user, the user can acquire unique information. In addition, it is possible to perform various types of processing using the carrier identification information correlated with the user by the reader device in other devices.

Further, the reader device described above may further include a carrier identification information storage unit storing one or a plurality of carrier identification information, wherein the user correlation unit avoids the selection when the one or the plurality of carrier identification information stored in the carrier identification information storage unit has/have been read by the carrier identification information reader unit.

An object stationary set in a home of the user is unlikely to be carried by the user, and the carrier identification information stored in the data carrier provided to the object is incompetent as user-related carrier identification information of the user. Further, an object set at public places such as a workplace and a commuter train cannot be evaluated as an object carried by a user even when carrier identification information stored in a data carrier provided thereto is read by the reader device a number of times. According to the present invention, it is possible to store carrier identification information stored in a data carrier provided to such objects in advance, and to not correlate the carrier identification information with the user. Thus, correlation of the user with inappropriate carrier identification information can be prevented.

Furthermore, in the reader device described above, the storage unit may store at least a part of the data carriers as a fixed data carrier, the reader device may further include a home correlation unit selecting at least one carrier identification information from the carrier identification information read by the information reader unit and used for identifying the data carrier stored in the storage unit as the fixed data carrier according to the number of times counted by the reading time counting unit, and correlating the selected carrier identification information with a home of the user, and the carrier identification information stored in the carrier identification information storage unit may be the carrier identification information correlated with the home of the user by the home correlation unit.

Thus, the carrier identification information correlated with the home of the user can be stored as identification information inappropriate to be selected as the carrier identification information.

Further, the reader device may further include a moving speed acquisition unit acquiring a moving speed of the reader device, wherein the user correlation unit avoids the selection when the moving speed is equal to or higher than a predetermined speed.

There is a high possibility that the carrier identification information read for a number of times by the reader device in a crowded place such as a commuter train is read from a data carrier mounted to an object carried by other people. Accordingly, it is difficult to judge the information as a carrier identification information of an object carried by the user. According to the present invention, it is possible to judge whether the user is moving or not and to not correlate the user with carrier identification information read during movement. Thus, correlation of the user with inappropriate carrier identification information can be prevented.

Further, in the reader device described above, the reading time counting unit may count a number of times the carrier identification information has been successively read by the carrier identification information reader unit.

An object provided with a data carrier storing carrier identification information that may be correlated with the user is to be carried by the user, and the carrier identification information thereof is to be successively read from the data carrier. According to the present invention, the number of times the carrier identification information is successively read by the carrier identification information reader unit can be counted, whereby carrier identification information appropriate for correlation with the user can be selected.

Further, an information providing system according to the present invention includes a reader device; a database device; and an information providing device, wherein the reader device which is carried by a user and includes carrier identification information reader unit reading carrier identification information for identifying a data carrier in a non-contact state from the data carrier, includes a reading time counting unit counting a number of times of reading by the carrier identification information reader unit with respect to the carrier identification information read by the carrier identification information reader unit; a user correlation unit selecting at least one carrier identification information from carrier identification information read by the carrier identification information reader unit according to the number of times counted by the reading time counting unit, and correlating the selected carrier identification information with the user; and an information transmission unit transmitting the carrier identification information correlated by the user correlation unit to the database device; the database device includes a carrier identification information storage unit storing the carrier identification information transmitted from the information transmission unit in correlation with the user; and the information providing device includes a carrier identification information reader unit reading at least one carrier identification information for identifying a data carrier in a non-contact state from the data carrier; and an information providing unit performing predetermined information providing processing regarding the user when the carrier identification information stored in correlation with the user in the carrier identification information storage unit is contained in the read carrier identification information.

Thus, the database device can store the carrier identification information in correlation with the user, and the information providing device can perform predetermined information providing processing regarding the user corresponding to the carrier identification information read by the information providing device itself.

Further, a reader device according to another aspect of the present invention which recognizes a data carrier capable of receiving and transmitting a radio wave from among a plurality of data carriers set at a plurality of locations respectively, for reading provided information from provided information storage unit which stores data carrier identification information for identifying the data carrier in correlation with the provided information and providing the read provided information to a user, includes an adjacent data carrier identification information storage unit storing adjacent data carrier identification information indicating a data carrier set at a location adjacent to a location at which the each of the data carriers is set, in correlation with each of the data carriers; a destination data carrier identification information acquisition unit acquiring destination data carrier identification information for identifying a data carrier set at a destination of the user; a data carrier series acquisition unit acquiring a plurality of data carrier series containing a plurality of data carrier identification information indicating a route of the user from a current location to the destination based on a data carrier actually recognized, the data carrier indicated by the destination data carrier identification information, and the adjacent data carrier identification information stored in the adjacent data carrier identification information storage unit; and a provided information acquisition unit acquiring the provided information stored in the provided information storage unit in correlation with the data carrier identification information indicating at least a part of the plurality of data carriers contained in the plurality of data carrier series.

Thus, the reader device can predict the moving route of the user by the data carrier series acquisition unit, and further acquire in advance the provided information with respect to a location for which the provided information is to be acquired (e.g., in a case where payment information at a certain location is stored, it is judged that there is a store at the location and that provided information, such as information on a product on sale, is to be acquired) among locations on the route. As a result, convenience of the data carrier system is improved.

Further, in the reader device described above, the reader device may further include a arrival time acquisition unit acquiring, with respect to the plurality of data carrier series, a time required for the user to arrive at the destination using the route indicated by the data carrier series, and a time required for the user to arrive at each of at least a part of the plurality of data carriers contained in the data carrier series, wherein the provided information acquisition unit determines a data carrier acquiring the provided information among the plurality of data carriers contained in each of the plurality of data carrier series, based on the times acquired by the arrival time acquisition unit.

It is considered that the shorter the time is until reaching the destination, the higher the possibility of the route being chosen. On the other hand, it is considered that the shorter the time is until reaching the location for which the provided information is to be acquired, the faster the speed at which the provided information needs to be acquired. In this regard, since the reader device acquires the provided information according to those times, the provided information can be acquired from that with higher priority.

Further, in this reader device, the adjacent data carrier identification information storage unit may store the adjacent data carrier identification information indicating the data carrier set at the location adjacent to the location at which each of the data carriers is set in correlation with each of the data carriers, and stores time information indicating a time required for moving between the adjacent locations, and the arrival time acquisition unit may acquire each of the times through calculation based on the time information stored in the adjacent data carrier identification information storage unit.

Thus, the reader device can calculate the arrival time based on the time information stored in the adjacent data carrier identification information storage unit.

Further, in this reader device, the reader device may further include a vicinal data carrier specifying unit specifying a data carrier in the vicinity of the data carrier contained in each of the data carrier series based on the time information stored in the adjacent data carrier identification information storage unit, wherein the provided information acquisition unit adds the data carrier specified by the vicinal data carrier specifying unit to the data carriers contained in each of the data carrier series, and acquires the provided information stored in correlation with the data carrier identification information indicating at least a part of the data carriers in the provided information storage unit.

Thus, the reader device can acquire in advance the provided information of the location where the user may come by even when the location is not on the route of the user.

Further, in each of the reader devices described above, the adjacent data carrier identification information storage unit may store data carrier identification information indicating a data carrier that has been recognized subsequent to the data carrier actually recognized as the adjacent data carrier identification information indicating the data carrier set at the location adjacent to the location at which the data carrier actually recognized is set.

Thus, the reader device can successively update the adjacent data carrier identification information along with the movement of the user.

Further, in each of the reader devices described above may further include a schedule information storage unit storing schedule information indicating a schedule of a user, wherein the destination data carrier identification information acquisition unit acquires the destination data carrier identification information for identifying the data carrier set at the destination of the user based on the schedule information stored in the schedule information storage unit.

Thus, the reader device can acquire the destination data carrier identification information from the schedule of the user.

Further, a provided information acquisition method according to the present invention of acquiring provided information regarding a moving destination prior to a movement of a user, which uses a reader device which recognizes a data carrier capable of receiving and transmitting a radio wave from among a plurality of data carriers set at a plurality of locations respectively, for reading provided information from provided information storage unit which stores data carrier identification information for identifying the data carrier in correlation with the provided information and providing the read provided information to the user, the method includes a destination data carrier identification information acquisition step of acquiring destination data carrier identification information for identifying a data carrier set at a destination of the user; a data carrier series acquisition step of acquiring a plurality of data carrier series containing a plurality of data carrier identification information indicating a route of the user from a current location to the destination based on a data carrier actually recognized, the data carrier indicated by the destination data carrier identification information, and adjacent data carrier identification information indicating a data carrier set at a location adjacent to a location at which each of the data carriers is set; and a provided information acquisition step of acquiring the provided information stored in the provided information storage unit in correlation with the data carrier identification information indicating at least a part of the plurality of data carriers contained in each of the plurality of data carrier series.

BRIEF DESCRIPTION OF THE DRAWINGS

FIG. 2 is a functional block diagram of a cellular phone according to the first embodiment of the present invention.

FIG. 3 is a diagram showing a category storage table according to the first embodiment of the present invention.

FIG. 4 is a diagram showing a temporary user correlation table according to the first embodiment of the present invention.

FIG. 5 is a diagram showing a temporary aboard carrier identification information table according to the first embodiment of the present invention.

FIG. 6 is a diagram showing an acquisition carrier identification information table according to the first embodiment of the present invention.

FIG. 7 is a diagram showing a home correlation table according to the first embodiment of the present invention.

BEST MODE FOR CARRYING OUT THE INVENTION

[Embodiment 1]

A first embodiment of the present invention will be described with reference to the drawings.

Figure 1:
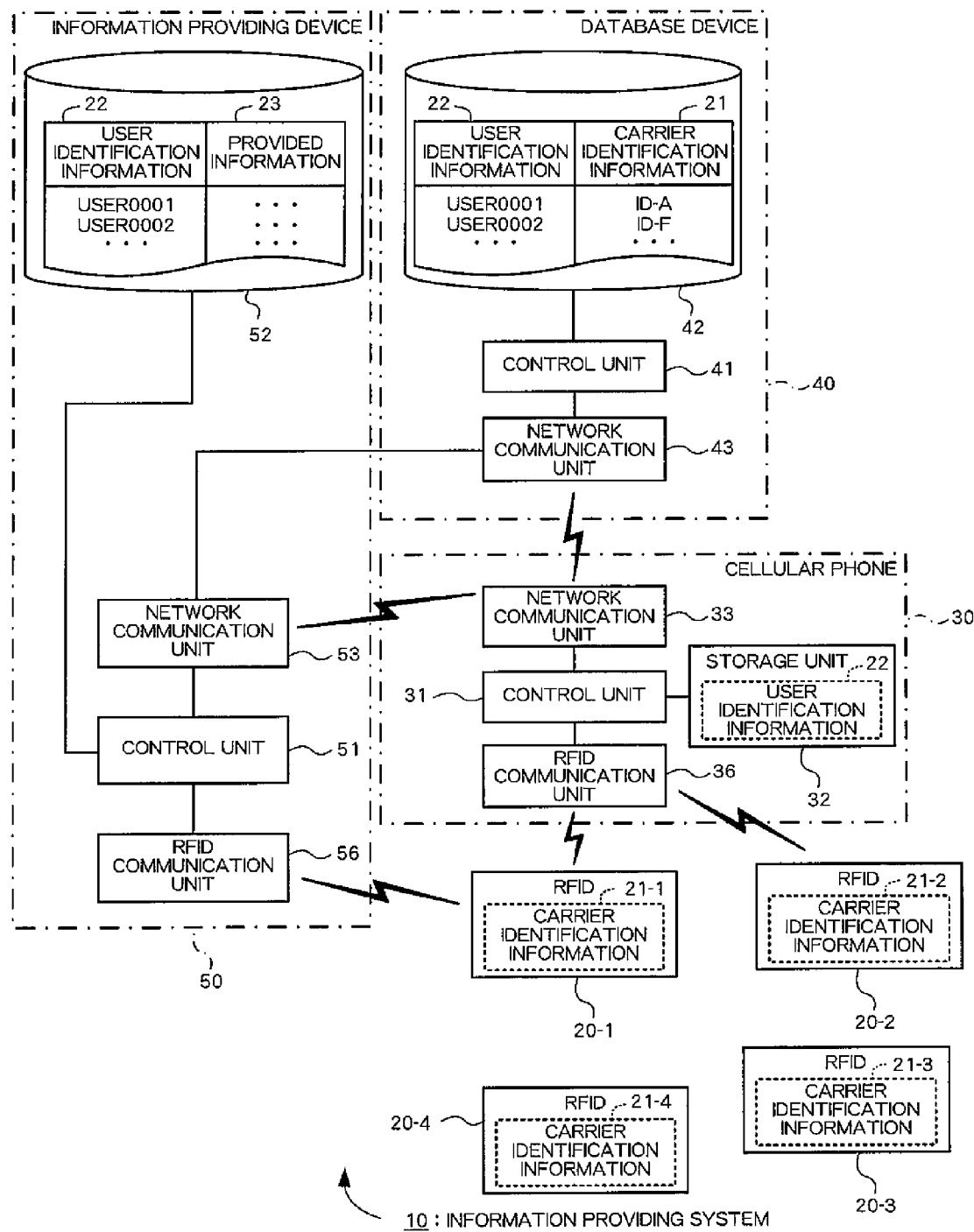
FIG. 1 is a diagram showing a system configuration of an information providing system according to a first embodiment of the present invention.

FIG. 1 is a system configuration diagram of an information providing system 10 according to this embodiment. As shown in the figure, the information providing system 10 includes a plurality of RFIDs 20, a cellular phone 30, a database device 40, and an information providing device 50.

Each RFID 20 is a device functioning as a data carrier capable of storing data, and is attached to a moving object or a fixed object. Further, each RFID 20 is configured such that data stored therein can be read by an RFID reader described later in a non-contact state. Specifically, each RFID 20 may be configured such that the data is read by modulating a magnetic field generated by the RFID reader according to the stored data (passive type or semi-passive type), or may be configured such that the data is read by transmitting radio waves according to the stored data in a case where radio waves transmitted from the RFID reader are received (active type).

Each RFID 20 is assigned identification information (carrier identification information 21) by which the RFID 20 can be uniquely identified among the plurality of RFIDs 20. Each RFID 20 stores the carrier identification information 21 assigned to itself as a part of the stored data.

The cellular phone 30 includes a control unit 31, a storage unit 32, a network communication unit 33, and an RFID communication unit 36.

The control unit 31 includes a processing unit for executing programs stored in the storage unit 32, and controls each unit of the cellular phone 30. The control unit 31 also performs various types of processing such as user correlation processing, aboard judgment processing, and home correlation processing.

The network communication unit 33 includes an antenna and is configured to be communicable with a base station device in a mobile communication system. The control unit 31 transmits/receives predetermined information through the network communication unit 33 to thereby communicate with the database device 40 and the information providing device 50.

The storage unit 32 stores programs for carrying out this embodiment. The storage unit 32 functions as a work memory for the control unit 31. Further, the storage unit 32 stores identification information (user identification information 22) additionally assigned for each user.

The RFID communication unit 36 transmits radio waves to the RFIDs 20 located in the vicinity thereof (in a range where radio waves can be transmitted/received between the RFID communication unit 36 and the RFIDs 20) to thereby read data stored in the RFID 20. In an example shown in FIG. 1, the RFID communication unit 36 can read data stored in an RFID 20-1 and an RFID 20-2 that are located in the vicinity thereof, but cannot read data stored in an RFID 20-3 and an RFID 20-4 that are not located in the vicinity thereof. The RFID communication unit 36 outputs the read data to the control unit 31.

The cellular phone 30 is thus configured as an RFID reader capable of reading data stored in the RFID 20. Specifically, the cellular phone 30 transmits a readout signal to each of the RFIDs 20 and receives a data signal returned in response to the readout signal. The data signal contains data stored in the RFIDs 20, and the cellular phone 30 acquires data stored in the RFIDs 20 from the data signal. As described above, each RFID 20 stores the carrier identification information 21, and the cellular phone 30 also functions as a reader device by acquiring the carrier identification information 21 contained in the data signal.

The database device 40 includes a control unit 41, a storage unit 42, and a network communication unit 43.

The control unit 41 includes a processing unit for executing programs stored in the storage unit 42, and controls each unit of the database device 40.

The network communication unit 43 is connected to a plurality of communication systems and configured so as to communicate with other devices connected to the communication systems. One of the communication systems is a mobile communication system. The network communication unit 43 includes an antenna, and is configured so as to communicate with a base station device in the mobile communication system. The control unit 41 transmits/receives predetermined information through the network communication unit 43 to thereby communicate with the cellular phone 30 and the information providing device 50.

The storage unit 42 stores programs for carrying out this embodiment. The storage unit 42 also functions as a work memory for the control unit 41. Further, the storage unit 42 stores the user identification information 22 and the carrier identification information 21 to be correlated with each other. Specifically, the carrier identification information 21 is stored in correlation with a user identified by the user identification information 22 in the storage unit 42.

The carrier identification information 21 thus correlated with a user is selected for each user. In the selection processing, carrier identification information 21 of an RFID 20 constantly carried by a user is selected as carrier identification information 21 correlated with the user. Specifically, the carrier identification information 21 correlated with the user is selected from carrier identification information 21 which have been acquired many times in succession in the user correlation processing (described later) executed by the cellular phone 30 that is constantly carried by the user.

It should be noted that the information providing system 10 includes a plurality of cellular phones 30 in reality, and each cellular phone 30 is carried by each user. The control unit 41 receives the carrier identification information 21 selected as described above for each user from the cellular phones 30 of the users through the network communication unit 43, and stores them in correlation with each user identification information 22 for each user in the storage unit 42.

The information providing device 50 includes a control unit 51, a storage unit 52, a network communication unit 53, and an RFID communication unit 56. Note that the database device 40 and the information providing device 50 are described as different devices in FIG. 1, but the devices may form an integrated device.

The control unit 51 includes a processing unit for executing programs stored in the storage unit 52, and controls each unit of the information providing device 50.

The storage unit 52 stores programs for carrying out this embodiment. The storage unit 52 also functions as a work memory for the control unit 51. Further, the storage unit 52 stores the user identification information 22 and provided information 23 to be correlated with each other. The provided information 23 is information provided in correlation with the user identified by the user identification information 22. Specifically, the provided information 23 may be information provided to the user identified by the user identification information 22, or may be information for providing information regarding the user identified by the user identification information 22 to others.

The network communication unit 53 is connected to a plurality of communication systems and is configured so as to communicate with other devices connected to the communication systems. One of the communication systems is a mobile communication system. The network communication unit 53 includes an antenna and is configured so as to communicate with a base station device in the mobile communication system. The control unit 51 transmits/receives predetermined information through the network communication unit 53 to thereby communicate with the cellular phone 30 and the database device 40.

The RFID communication unit 56 transmits radio waves to the RFIDs 20 located in the vicinity thereof (in a range where radio waves can be transmitted/received between the RFID communication unit 56 and the RFIDs 20) to thereby read data stored in the RFIDs 20. The RFID communication unit 56 outputs the read data to the control unit 51.

The information providing device 50 is thus configured as an RFID reader capable of reading data stored in the RFIDs 20. Specifically, the information providing device 50 transmits a readout signal to the RFIDs 20 and receives a data signal returned in response to the readout signal. The data signal contains data stored in the RFIDs 20, and the information providing device 50 acquires the data stored in the RFID 20 from the data signal. Note that each RFID 20 stores the carrier identification information 21 as described above, and the information providing device 50 also functions as a reader device by acquiring the carrier identification information 21 contained in the data signal.

It should be noted that the RFID communication unit 56 is a part of the information providing device 50 in this case, but in many cases, the RFID communication unit 56 is configured as a single device and is connected to other units included in the information providing device 50 with a communication line.

Here, information providing processing performed by the information providing device 50 and the database device 40 will be described.

The control unit 51 transmits the carrier identification information 21 contained in the data acquired by the RFID communication unit 56 to the database device 40 through the network communication unit 53.

The control unit 41 receives the carrier identification information 21 transmitted from the information providing device 50 through the network communication unit 43. Then, the control unit 41 reads the user identification information 22 stored in correlation with the received carrier identification information 21 from the storage unit 42, and returns the read user identification information 22 to the information providing device 50.

The control unit 51 reads the provided information 23 stored in correlation with the user identification information 22 thus returned from the storage unit 52. Specifically, the control unit 51 uses the user identification information 22 to select the provided information 23 based on the carrier identification information 21 contained in the data acquired by the RFID communication unit 56. Then the control unit 51 provides the selected provided information 23 to the cellular phone 30 and other devices (not shown), thereby providing the provided information 23 to be provided in correlation with the user. In other words, the information providing device 50 thus performs predetermined information providing processing regarding each user, to thereby cause the cellular phone 30 and other devices to acquire the provided information 23 regarding each user.

Functions of the cellular phone 30 will be described in detail. FIG. 2 is a functional block diagram showing functional blocks of the cellular phone 30.

As shown in FIG. 2, the cellular phone 30 includes an I/O unit 34 and a GPS reception unit 35 as well as the above-mentioned control unit 31, storage unit 32, network communication unit 33, and RFID communication unit 36. Further, the control unit 31 includes a carrier identification information acquisition unit 310, a user correlation unit 311, a home correlation unit 312, a reader position acquisition unit 313, an aboard judgment unit 314, and a provided information acquisition unit 315.

As described above, each RFID 20 is used by being attached to a moving object or a fixed object. The storage unit 32 categorizes objects to which each RFID 20 is attached specifically. As shown in a category storage table of FIG. 3, the storage unit 32 categorizes the objects into the following categories in correlation with the carrier identification information 21 for each RFID 20 and stores them. The categories include: one (portable ID) to be attached to an object carried by a person (e.g., bag or cellular phone); one (wearable ID) to be attached to an object worn by a person (e.g., watch or shoes); one (moving ID) to be attached to an object such as an automotive vehicle; one (semi-fixed ID) to be attached to an object which is fixed but can be easily moved (e.g., bus stop sign or wagon in front of a shop); and one (fixed ID) attached to a fixed object (e.g., home or road sign). Those categories are determined in advance and are stored in the storage unit 32.

The storage unit 32 also stores a temporary user correlation table shown in FIG. 4, a temporary aboard carrier identification information table shown in FIG. 5, an acquisition carrier identification information table shown in FIG. 6, and a home correlation table shown in FIG. 7. Detailed descriptions thereof will be made later. Further, the storage unit 32 stores the above-mentioned user identification information 22 for identifying the user of the cellular phone 30.

The I/O unit 34 is a human-machine interface for the user of the cellular phone 30. Specifically, a keypad, a microphone, a speaker, or the like can be used. The control unit 31 receives an input of the user through the I/O unit 34 and outputs information to the user.

The GPS reception unit 35 includes a GPS receiver to receive radio waves from a plurality of GPS satellites, and calculates a position of the cellular phone 30 on Earth, that is, a latitude/longitude thereof. Then the GPS reception unit 35 outputs position information indicating the calculated position of the cellular phone 30 to the control unit 31.

Hereinafter, functions of the cellular phone 30 will be described in detail. In a case where the cellular phone 30 is carried by the user, the RFID communication unit 36 periodically reads data stored in the RFID 20 located in the vicinity of a place where the user is (in a range where radio waves can be transmitted/received between the RFID communication unit 36 and the RFIDs 20). Incidentally, a person always wears or carriers some preferred objects (e.g., watch or bag) while he/she is out. The objects are attached with the RFIDs 20. For this reason, when a person is out, the RFID communication unit 36 of the cellular phone 30 carried by the person constantly reads the RFID 20 attached to the object worn or carried by the person. Similarly, when the person is at home, the RFID communication unit 36 reads the RFID 20 attached to the home. Further, when the person is out, the RFID communication unit 36 reads the RFIDs 20 attached to various objects on the road. The RFID communication unit 36 outputs those read data to the carrier identification information acquisition unit 310.

The carrier identification information acquisition unit 310 acquires the carrier identification information of each RFID 20 from the input data, and outputs the acquired carrier identification information to the user correlation unit 311, the home correlation unit 312, and the aboard judgment unit 314.

The provided information acquisition unit 315 acquires the provided information 23 transmitted by the information providing device 50 through the network communication unit 33. The provided information acquisition unit 315 performs processing such as storage of the received provided information 23 in the storage unit 32 and notification of the provided information 23 to each user through the I/O unit 34. Note that, in a case where the information providing device 50 has transmitted the provided information 23 to another device, the another device performs predetermined processing according to the provided information 23, such as notification of the provided information 23 to the own user.

In this embodiment, the cellular phone 30 selects the RFID 20 correlated with the own user. Specifically, the cellular phone 30 selects the RFID 20 attached to the object worn or carried by the user while the user is out. Such an RFID 20 is constantly located in the vicinity of the cellular phone 30 like the RFID 20-1 shown in FIG. 1, so the RFID 20 is constantly read by the RFID communication unit 36 as described above.

The user correlation unit 311 selects the carrier identification information 21 which satisfies a predetermined condition from the RFIDs 20 thus constantly read by the RFID communication unit 36, and performs user correlation processing of correlating the carrier identification information 21 with the user. Specifically, the carrier identification information 21 of the RFID 20, which is read during the time when the user is out and not read during the time when the user is in a vehicle, is correlated with the user.

Further, the user correlation unit 311 transmits the carrier identification information 21 correlated with the user and the user identification information 22 stored in the storage unit 32 to the database device 40 through the network communication unit 33.

In order to judge whether or not the user is out, the home correlation unit 312 performs home correlation processing of correlating the carrier identification information 21 of the RFID 20 attached to the home of the user with the home of the user. In the home correlation processing, as will be described later, the carrier identification information 21 correlated with the home of the user is selected from carrier identification information 21 of RFIDs 20 that are stored as a fixed ID or a semi-fixed ID and are read many times in succession. Thus, the cellular phone 30 can judge that the user is not out during a time when the carrier identification information 21 correlated with the home of the user is acquired. Note that the "home" in this case refers to a concept indicating a place where the user stays for a long period of time.

Further, the aboard judgment unit 314 performs aboard judgment processing of judging whether or not the user is in a vehicle based on a change of a position of the user which is acquired by the reader position acquisition unit 313 during the time when the RFID 20 stored as a moving ID in the category storage table is read.

Hereinafter, each processing will be described in detail with reference to a flowchart of the processing.

Figure 8:
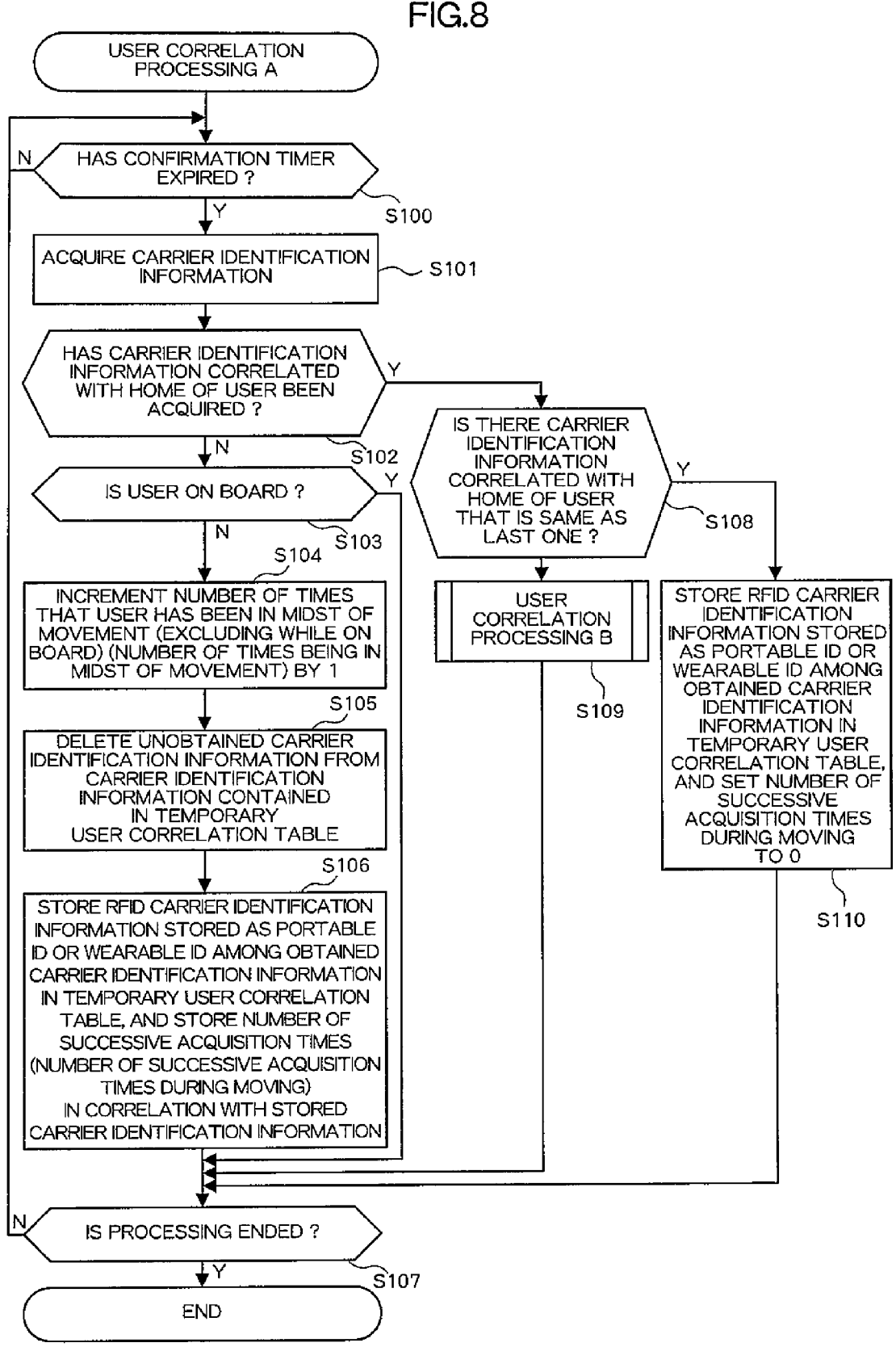
FIG. 8 is a flowchart of processing according to the first embodiment of the present invention.
Figure 9:
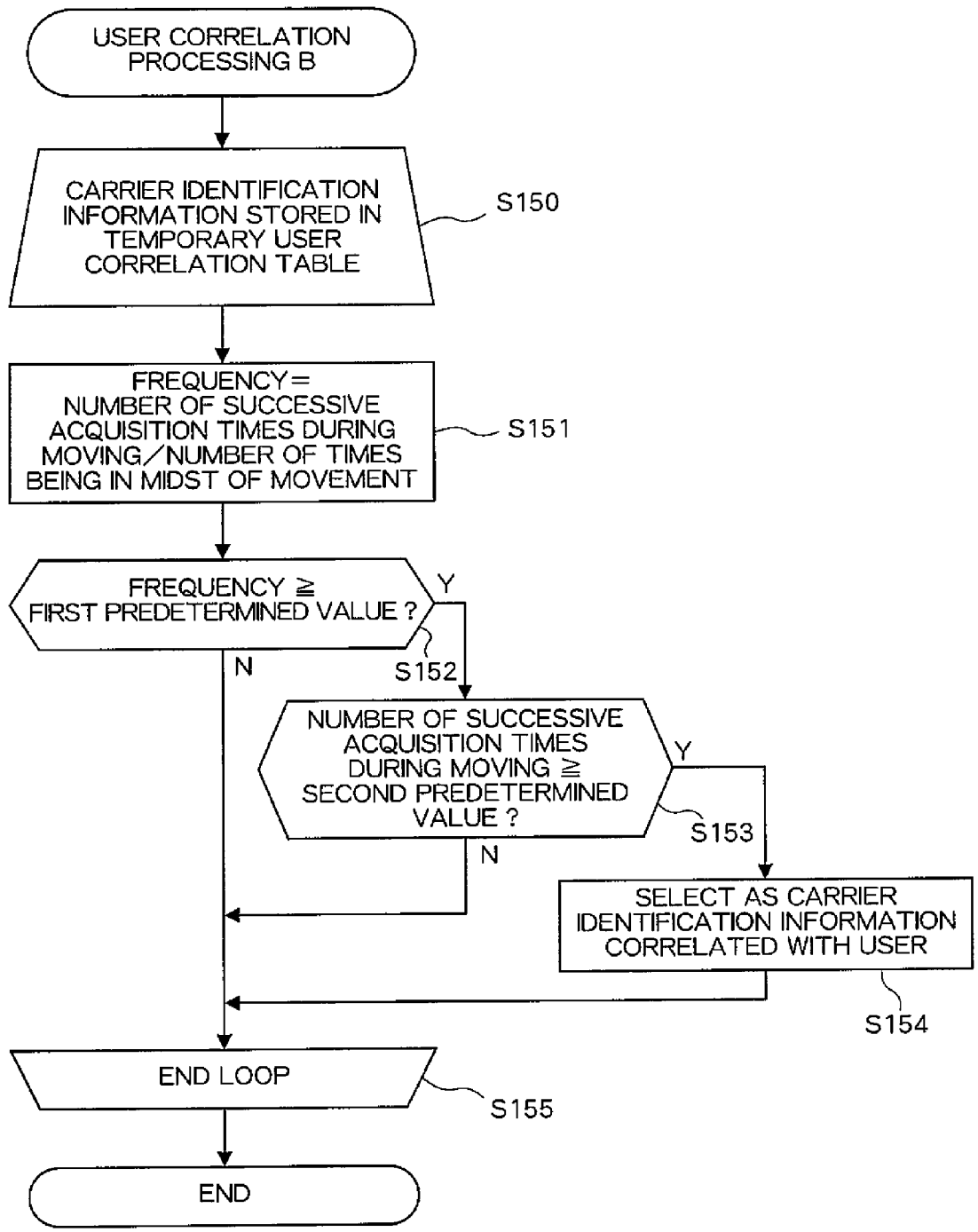
FIG. 9 is a flowchart of processing according to the first embodiment of the present invention.

FIGS. 8 and 9 are flowcharts of the user correlation processing. As shown in FIG. 8, the user correlation unit 311 first waits until a confirmation timer has expired, and advances to the subsequent processing (S100). By adding the processing of waiting for the confirmation timer to expire, the following processing is performed periodically. After the confirmation timer has expired, the user correlation unit 311 acquires carrier identification information 21 of the RFIDs 20 acquired at the current time by the carrier identification information acquisition unit 310 (S101). Then the user correlation unit 311 judges whether the carrier identification information 21 stored in the home correlation table is included in the acquired carrier identification information 21 (S102). The home correlation table is a table for storing the carrier identification information 21 correlated with the home of the user in the home correlation processing.

When the judgment result shows "No" in S102, the user correlation unit 311 judges whether or not the user is on board (S103). The aboard judgment processing therefore will be described later. When it is judged that the user is on board, the user correlation unit 311 does not perform each processing of S104 to S106, and judges whether the processing is completed (S107). Specifically, when having judged that the user is on board, the user correlation unit 311 restricts selection of the carrier identification information 21 to be correlated with the user. More specifically, the user correlation unit 311 does not select the carrier identification information 21.

It should be noted that the judgment as to the completion of the processing means judgment as to whether or not the user correlation unit 311 completes the user correlation processing. In a case where the user correlation unit 311 does not complete the user correlation processing, the user correlation unit 311 newly waits for the confirmation timer to expire and repeats the user correlation processing. In a case where the user correlation unit 311 completes the user correlation processing, the user correlation unit 311 stops the confirmation timer and ends the processing.

On the other hand, when having judged that the user is not on board in S103, the user correlation unit 311 adds 1 to a variable "number of times being in the midst of movement" which indicates the number of times of cases where the user has been in the midst of movement (S104). When a storage area for the variable "number of times being in the midst of movement" is not secured, the user correlation unit 311 newly secures the storage area.

Then the user correlation unit 311 deletes carrier identification information 21 which have not been acquired in S101 from the carrier identification information 21 stored in the temporary user correlation table (S105). The temporary user correlation table is a table for temporarily storing carrier identification information 21 judged that may be correlated with the user. Each carrier identification information 21 is stored in correlation with the number of successive acquisition times during movement which indicates the number of times of successive acquisition during movement of the user.

Then, the user correlation unit 311 stores in the temporary user correlation table each carrier identification information 21 of the RFIDs 20 stored as a portable ID or a wearable ID in the category storage table among carrier identification information 21 acquired in S101, and adds 1 to the number of successive acquisition times during movement (S106). Thus, the user correlation unit 311 counts and stores the number of times of reading (reading time) by the RFID communication unit 36 with regard to each carrier identification information 21.

When each of the above-mentioned processing of S104 to S106 is ended, the user correlation unit 311 judges that the processing is completed (S107).

When the judgment result shows "Yes" in S102, the user correlation unit 311 does not perform the processing of S106. Specifically, when having judged that the carrier identification information 21 stored in correlation with the home of the user has been acquired, the user correlation unit 311 restricts selection of the carrier identification information 21 to be correlated with the user. Specifically, the user correlation unit 311 does not select the carrier identification information 21. Then, the user correlation unit 311 judges whether or not the carrier identification information 21 that is correlated with the home of the user and is the same as that acquired last is acquired (S108). Accordingly, the user correlation unit 311 holds the carrier identification information 21 which is judged as the carrier identification information 21 that is acquired in the processing one cycle before the repeated processing using the confirmation timer and is stored in the home correlation table in the processing of S102.

When the judgment shows "No" in S10, the user correlation unit 311 subsequently performs processing of S109. Details of the processing of S109 will be described later. On the other hand, when the judgment result shows "Yes" in S108, the user correlation unit 311 stores, in the temporary user correlation table, the carrier identification information 21 of the RFIDs 20 stored as the portable ID or the wearable ID in the category storage table among carrier identification information 21 acquired, and sets the number of successive acquisition times during movement to 0 (S110). When the processing of S109 or the processing of S110 is ended, the user correlation unit 311 judges that the processing is completed (S107).

FIG. 9 shows the processing of S109. The processing of S109 is processing of selecting the carrier identification information 21 correlated with the user from among the carrier identification information 21 stored in the temporary user correlation table. The processing is performed for each carrier identification information 21 stored in the temporary user correlation table (S150 and S155). First, the user correlation unit 311 secures a storage area for a variable "frequency" and substitutes a value obtained by dividing the number of successive acquisition times during movement stored in correlation with the carrier identification information 21 in the temporary user correlation table by the variable "number of times being in the midst of movement" into the variable "frequency" (S151). Then, the user correlation unit 311 judges whether or not a value of the variable "frequency" is a first predetermined value or larger (S152). In other words, the user correlation unit 311 judges whether or not a ratio at which the carrier identification information 21 is detected during movement is equal to or larger than a predetermined threshold represented by the first predetermined value.

When the judgment result shows "No" in S152, the processing advances to the processing for the subsequent carrier identification information 21 (S155). When the judgment result shows "Yes" in S152, the user correlation unit 311 then judges whether or not the number of successive acquisition times during movement is a second predetermined value or larger (S153). In other words, the user correlation unit 311 judges whether or not the carrier identification information 21 has been acquired the threshold number of times represented by the second predetermined value or more.

It should be noted that the second predetermined value, for example, may be a value obtained by multiplying the variable "number of times being in the midst of movement" by the first predetermined value, or may be a predetermined value not depending on the variable "number of times being in the midst of movement".

When the judgment result of S153 also shows "Yes", the user correlation unit 311 selects the carrier identification information 21 as the carrier identification information 21 correlated with the user, and correlates the carrier identification information 21 with the user (S154). Then the processing advances to processing for the subsequent carrier identification information 21 (S155).

As described above, the user correlation unit 311 selects the carrier identification information 21 correlated with the user from the carrier identification information 21 stored in the plurality of RFIDs 20 as a portable ID or a wearable ID in the category storage table, according to the number of acquisition times of each carrier identification information 21.

Figure 10:
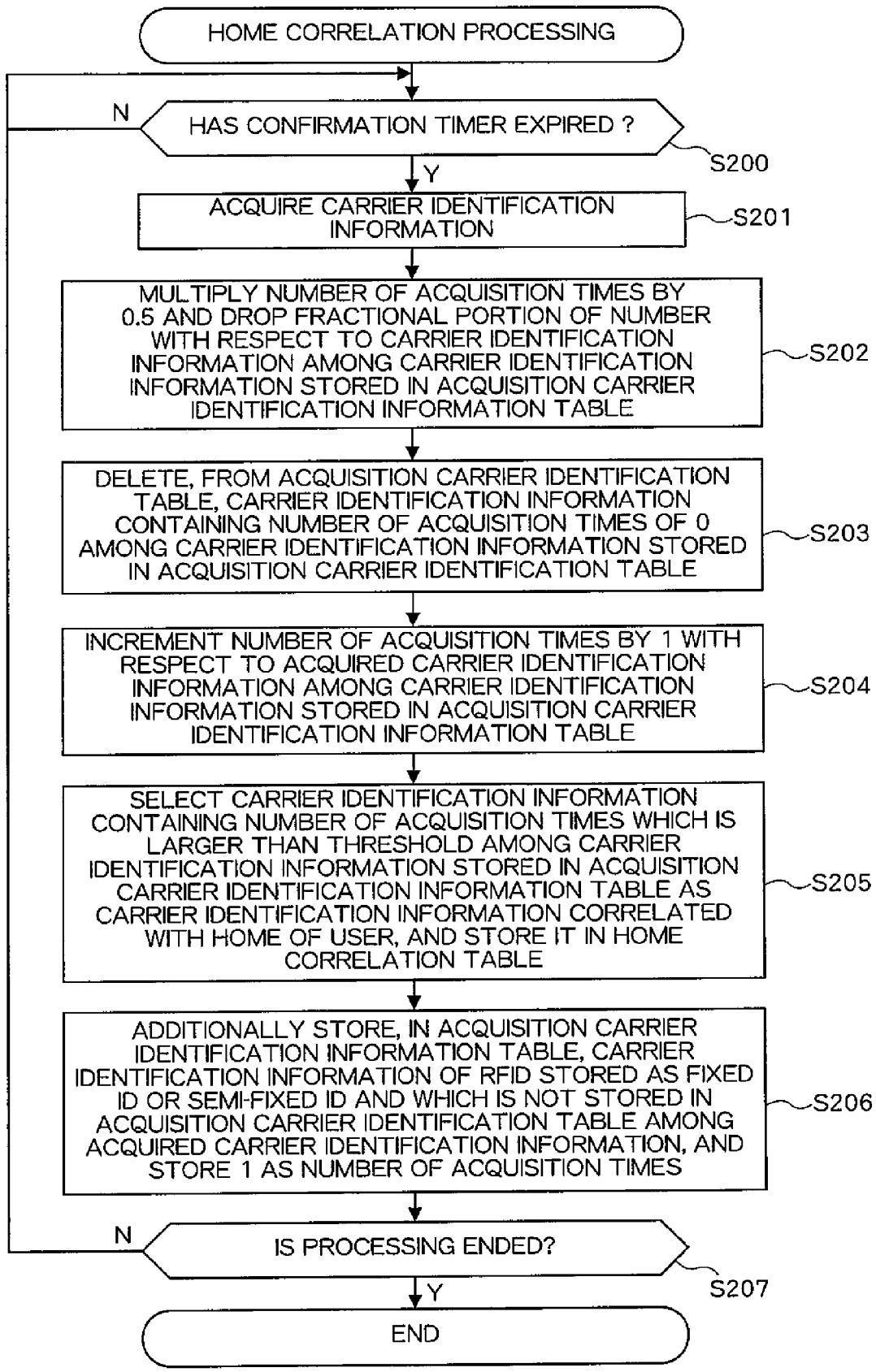
FIG. 10 is a flowchart of processing according to the first embodiment of the present invention.

Next, the home correlation processing will be described. FIG. 10 is a flowchart of the home correlation processing. As shown in the figure, the home correlation unit 312 first waits until the confirmation timer expires, and advances to the subsequent processing (S200). By adding the processing of waiting for the confirmation timer to expire, the following processing is performed periodically. After the confirmation timer has expired, the home correlation unit 312 acquires carrier identification information 21 of the RFIDs 20 obtained at the current time by the carrier identification information acquisition unit 310 (S201). Then the home correlation unit 312 stores the acquired carried identification information 21 in the acquisition carrier identification information table shown in FIG. 6. The acquisition carrier identification information table is a table storing the carrier identification information 21 acquired herein and the number of acquisition times.

Then, the home correlation unit 312 performs processing of multiplying the number of acquisition times by 0.5 and dropping the fractional portion of the acquired number, with respect to the carrier identification information 21 that has not been acquired in the processing of S201 among the carrier identification information 21 already stored in the acquisition carrier identification information table (S202). Then the home correlation unit 312 deletes the carrier identification information 21 stored in the acquisition carrier identification information table whose number of acquisition times is 0 from the acquisition carrier identification information table (S203).

Further, the home correlation unit 312 increments the number of acquisition times by one with respect to each carrier identification information 21 acquired in the processing of S201 among the carrier identification information 21 stored in the acquisition carrier identification information table (S204). In addition, the home correlation unit 312 selects the carrier identification information 21 whose number of acquisition times is larger than the predetermined threshold as the carrier identification information 21 correlated with the home of the user from the carrier identification information 21 stored in the acquisition carrier identification information table, and stores the selected carrier identification information 21 in the home correlation table shown in FIG. 7, thereby correlating the selected carrier identification information 21 with the home of the user (S205).

It should be noted that the home correlation unit 312 additionally stores, in the acquisition carrier identification information table, the carrier identification information 21 of the RFID 20 stored as the fixed ID or the semi-fixed ID in the category storage table and not stored in the acquisition carrier identification information table among the carrier identification information 21 acquired, and stores 1 as the number of acquisition times (S206). Thus, only the carrier identification information of the RFID 20 stored as the fixed ID or the semi-fixed ID is selected as the carrier identification information 21 correlated with the home of the user.

As described above, the home correlation unit 312 selects the carrier identification information 21 correlated with the home of the user from the carrier identification information 21 stored in the plurality of RFIDs 20 that are stored as the fixed ID or the semi-fixed ID in the category storage table, according to the number of acquisition times of each carrier identification information 21.

Figure 11:
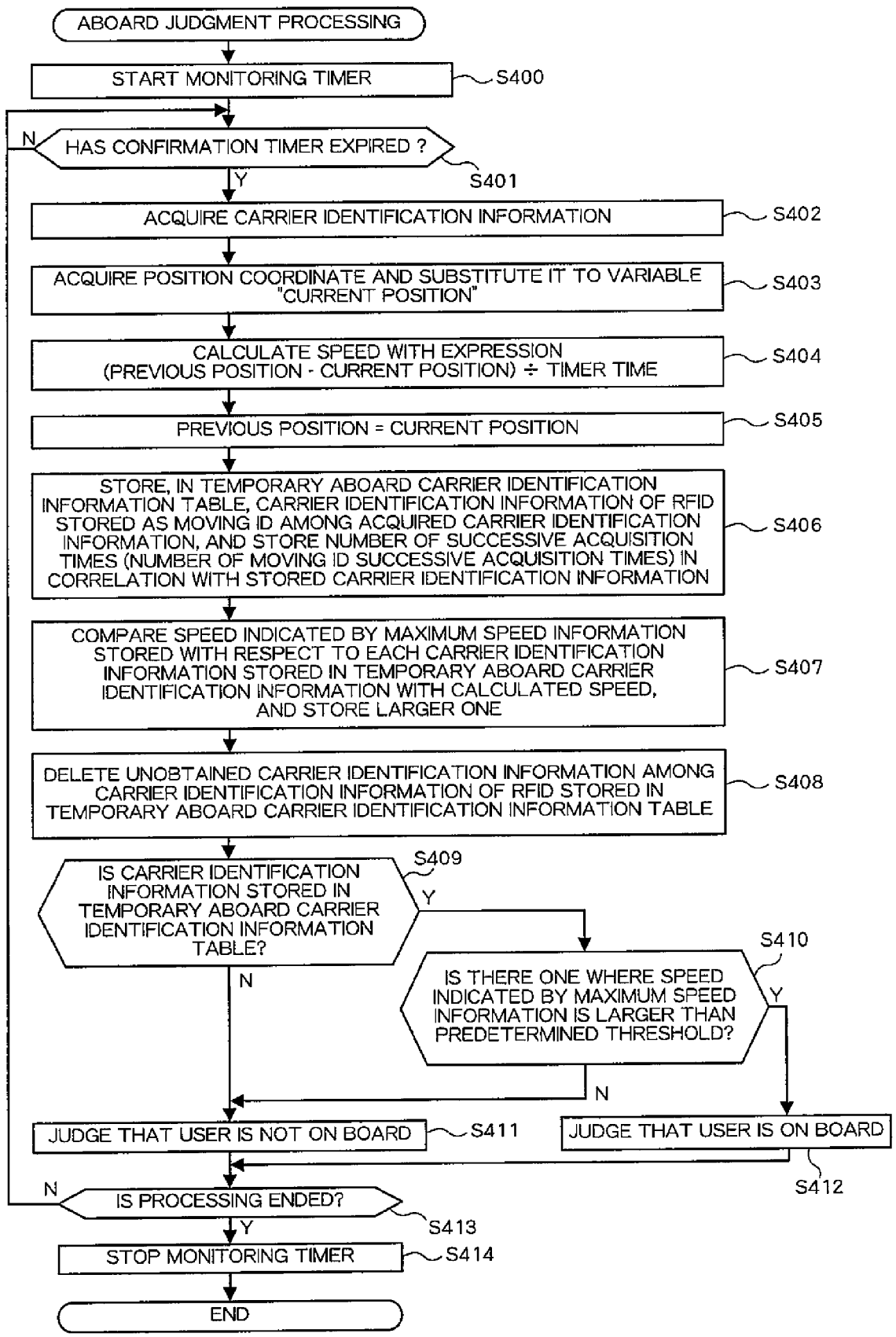
FIG. 11 is a flowchart of processing according to the first embodiment of the present invention.

Next, the aboard judgment processing will be described. FIG. 11 is a flowchart of the aboard judgment processing. As shown in the figure, the aboard judgment unit 314 first starts a monitoring timer (S400). Then the aboard judgment unit 314 waits until a monitoring timer expires, and advances to the subsequent processing (S401). By adding the processing of starting the monitoring timer and waiting for the monitoring timer to expire, the following processing is performed periodically from the starting point of the monitoring timer. After the monitoring timer has expired, the aboard judgment unit 314 acquires carrier identification information 21 of the RFIDs 20 obtained until the current time by the carrier identification information acquisition unit 310 (S402). At this time, the aboard judgment unit 314 acquires position information indicating a current position of the cellular phone 30 from the reader position acquisition unit 313, and substitutes the acquired position information for a variable "current position" (S403). Then a value obtained by dividing the variable "current position" by a variable "previous position" is divided by a time period from the time when the monitoring timer is started to the time when the monitoring timer has expired, thereby calculating a speed (S404). Note that contents of the variable "current position" is substituted for the variable "previous position" in processing of S405. Specifically, the aboard judgment unit 314 substitutes the contents of the variable "current position" for the variable "previous position" every time the processing is performed, and stores the resultant. Thus, the speed calculated in S404 represents an average speed at which the cellular phone 30 moves from a position indicated by the variable "previous position" to a position indicated by the variable "current position".

Then, the aboard judgment unit 314 stores, in the temporary aboard carrier identification information table shown in FIG. 5, carrier identification information 21 of the RFIDs 20 stored as the moving ID in the category storage table among the carrier identification information 21 acquired in S402 (S406). The temporary aboard carrier identification information table is a table for temporarily storing carrier identification information 21 of the RFIDs 20 stored as the moving ID in the category storage table for aboard judgment. Each carrier identification information 21 is stored in correlation with the number of successive moving ID acquisition times indicating the number of times of successive acquisition and maximum speed information indicating a maximum speed among speeds calculated in S404 when the moving ID is acquired. For this reason, the aboard judgment unit 314 acquires the number of times of successive acquisition of each carrier identification information 21, and stores it as the number of successive moving ID acquisition times (S406).

Then, the aboard judgment unit 314 compares the maximum speed information stored in correlation with each carrier identification information 21 in the temporary aboard carrier identification information table with the speed calculated in S404, and stores the larger one in the temporary aboard carrier identification information table as the maximum speed information (S407). Thus, the aboard judgment unit 314 updates the maximum speed information of each carrier identification information 21 to a larger one.

Further, the aboard judgment unit 314 deletes carrier identification information 21 which have not been acquired in S402 from the carrier identification information 21 stored in the temporary aboard carrier identification information table (S408). Thus, the aboard judgment unit 314 deletes the carrier identification information 21 which has not been successively acquired, and stores the carrier identification information 21 of the RFID 20 only in a case where the cellular phone 30 is moving together with the RFID 20 stored as the moving ID.

Then the aboard judgment unit 314 judges whether or not one or more of the carrier identification information 21 is stored in the temporary aboard carrier identification information table (S409). When one or more of the carrier identification information 21 is stored in the temporary aboard carrier identification information table, the aboard judgment unit 314 further judges whether or not there is carrier identification information 21 whose speed indicated by the maximum speed information stored in correlation with the stored carrier identification information 21 is the predetermined threshold or more (S410). Then, when there is the carrier identification information 21 whose speed is the predetermined threshold or more, the aboard judgment unit 314 judges that the user is on board (S412). When there is no carrier identification information 21 whose speed is the predetermined threshold or more, or when no carrier identification information 21 is stored in the temporary aboard carrier identification information table, the aboard judgment unit 314 judges that the user is not on board (S411). Thus, in a case where the carrier identification information 21 of the RFID 20 stored as the moving ID has not been acquired, the aboard judgment unit 314 judges that the user is not in a vehicle. Even in a case where the carrier identification information 21 of the RFID 20 stored as the moving ID has been acquired, when there is no carrier identification information 21 whose speed indicated by the maximum speed information is the predetermined threshold or more, the aboard judgment unit 314 judges that the user is not at least in a vehicle which moves at a speed equal to or higher than the speed indicated by the predetermined threshold.

When the above-mentioned processing is ended, the aboard judgment unit 314 judges that the processing is completed (S413). Judgment as to completion of the processing means judgment as to whether or not the aboard judgment unit 314 completes the execution of the aboard judgment processing. When the processing is not ended, the aboard judgment unit 314 newly waits until the confirmation timer expires and repeats the aboard judgment processing. In a case where the processing is to be ended, the aboard judgment unit 314 stops the confirmation timer (S414) to thereby complete the processing.

By the processing as described above, when the user carries the cellular phone 30 and reads the carrier identification information repeatedly from the specific RFID 20, the carrier identification information 21 can be selected as the carrier identification information 21 correlated with the user, and a registration operation for correlating the user with the carrier identification information 21 of the RFID 20 can be automated. Further, it is possible to provide information regarding the user based on the carrier identification information 21 correlated with the user. In other words, the cellular phone 30 can acquire and output information selected based on the carrier identification information 21 correlated with the user, which allows the user to acquire information unique to the user. Further, the information providing device 50 can execute various types of processing using the carrier identification information 21 correlated with the user by the cellular phone 30.

Further, the carrier identification information 21 stored in the RFID 20 attached to the home can be stored in advance and to not correlate with the user, so the carrier identification information 21 which is inappropriate to be correlated with the user can be prevented from being correlated with the user.

Further, it is possible to judge whether or not the user is moving and to not correlate the carrier identification information 21 which has been read while moving with the user, so the carrier identification information 21 which is inappropriate to be correlated with the user can be prevented from being correlated with the user.

Further, the carrier identification information acquisition unit 310 can correlate the carrier identification information 21 acquired in succession the predetermined number of times or more while the user is moving and which is not acquired only when the user is on board with the user.

[Embodiment 2]

A second embodiment of the present invention will be described with reference to the drawings.

Figure 12:
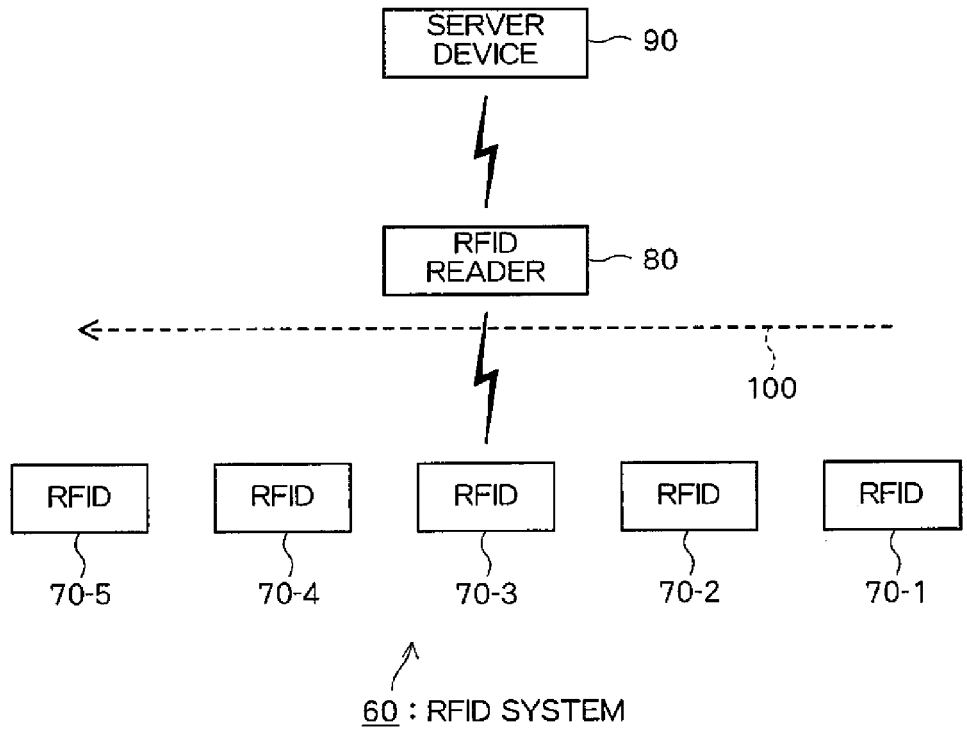
FIG. 12 is a diagram showing a system configuration of an RFID system according to a second embodiment of the present invention.

FIG. 12 is a system configuration diagram of an RFID system 60 according to this embodiment. As shown in the figure, the RFID system 60 includes a plurality of RFIDs 70, an RFID reader 80, and a server device 90.

Each RFID 70 is a device functioning as a data carrier capable of storing data, and is attached to a moving object or a fixed object. Each RFID 70 is configured such that data stored therein (stored data) can be read by the RFID reader 80 in a non-contact state. Specifically, each RFID 70 may be configured such that the data is read by modulating a magnetic field generated by the RFID reader 80 according to the stored data (passive type or semi-passive type), or may be configured such that the data is read by transmitting radio waves according to the stored data in a case where radio waves transmitted from the RFID reader 80 are received (active type).

Each RFID 70 is assigned identification information (RFID information) by which the RFID 70 can be uniquely identified among the plurality of RFIDs 70. Each RFID 70 stores the identification information assigned to itself as a part of the stored data.

The RFID reader 80 is provided to a cellular phone, for example, and is configured so as to read data stored in the RFID 70. Specifically, the RFID reader 80 transmits a readout signal to the RFID 70 and receives a data signal returned in response to the readout signal. The data signal contains data stored in the RFID 70, and the RFID reader 80 acquires data stored in the RFID 70 from the data signal. Note that the RFID 70 stores the identification information as described above, and the RFID reader 80 also functions as an identification information reader device by acquiring the identification information contained in the data signal.

The RFID reader 80 is carried by a person, and acquires identification information from RFIDs 70 capable of transmitting/receiving radio waves among the RFIDs 70 attached to various persons or objects. Accordingly, the RFID reader 80 recognizes the RFIDs 70 capable of transmitting/receiving radio waves.

Further the RFID reader 80 is connected to the server device 90 through a mobile communication system such as a cellular phone system or a wireless LAN system, and is configured so as to transmit the identification information of the RFID 70 to the server device 90.

The server device 90 is connected to the mobile communication system so as to be connected to the RFID reader 80. The server device 90 stores information to be provided to the RFID reader 80 or other devices (not shown) (hereinafter, referred to as "provided information") in correlation with the identification information of the RFID 70. Further, the server device 90 selects the provided information corresponding to the identification information received from the RFID reader 80 and transmits the selected provided information to the RFID reader 80 or the other devices.

The RFID reader 80 receives the provided information thus transmitted and provides the received provided information to each user.

In this embodiment, the RFID reader 80 estimates a moving route of a user, and transmits the identification information of the specific RFID 70 among the RFIDs 70 existing on the route to the server device 90. Specifically, the RFID reader 80 acquires the provided information corresponding to the identification information prior to recognition of the RFID 70.

Hereinafter, functions of the RFID reader 80 will be described.

Figure 13:
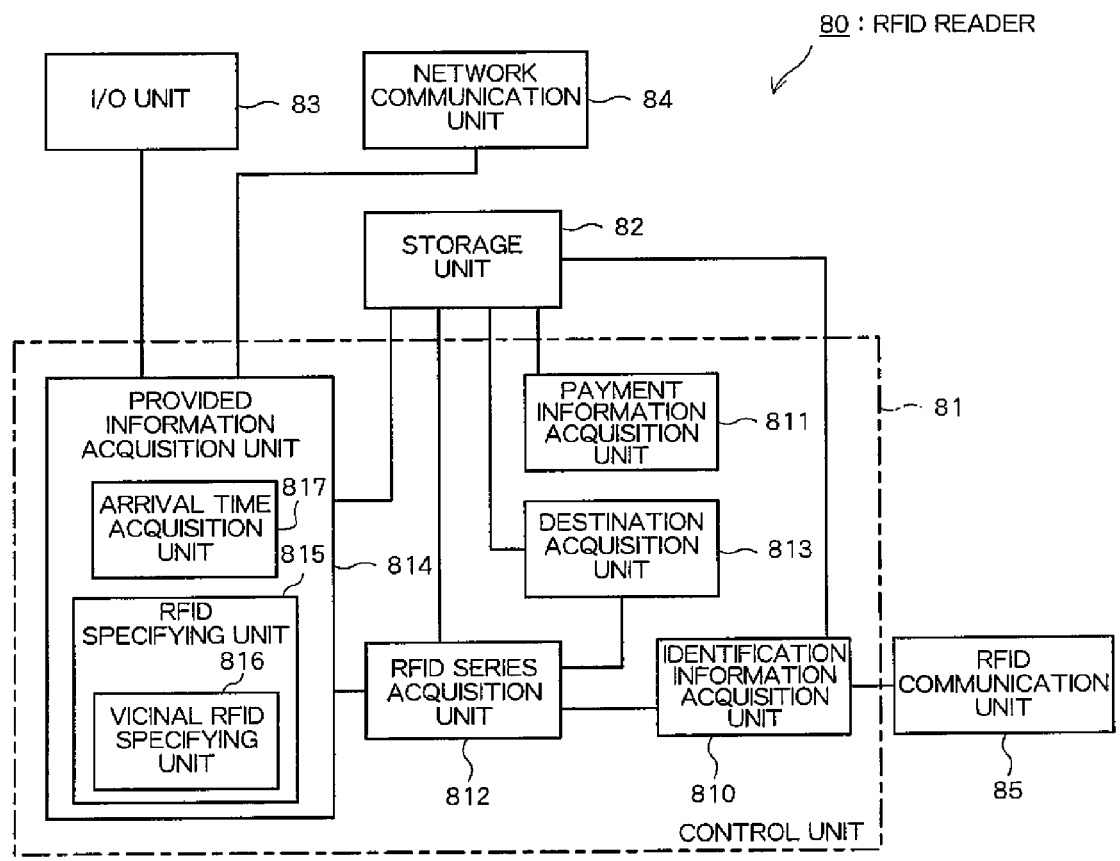
FIG. 13 is a diagram showing functional blocks of an RFID reader according to the second embodiment of the present invention.

FIG. 13 is a functional block diagram showing functional blocks of the RFID reader 80. As shown in FIG. 13, the RFID reader 80 functionally includes a control unit 81, a storage unit 82, an I/O unit 83, a network communication unit 84, and an RFID communication unit 85. The control unit 81 includes an identification information acquisition unit 810, a payment information acquisition unit 811, an RFID series acquisition unit 812, a destination acquisition unit 813, and a provided information acquisition unit 814. Further, the provided information acquisition unit 814 includes an RFID specifying unit 815 and an arrival time acquisition unit 817. Further, the RFID specifying unit 815 includes a vicinal RFID specifying unit 816.

The control unit 81 includes a processing unit for executing programs stored in the storage unit 82 and controls each unit of the RFID reader 80. Details of the control unit 81 will be described later.

The storage unit 82 stores programs for carrying out this embodiment. The storage unit 82 also functions as a work memory for the control unit 81. Further, the storage unit 82 stores various information such as position information, successive acquisition time, provided information acquisition information, payment information, adjacent identification information, and non-acquisition time (hereinafter, collectively referred to as "identification information-related information") in correlation with each identification information of the RFIDs 70. Among the information, the position information is information for specifying a position at which each RFID 70 is installed (e.g., latitude/longitude information). The other information will be described in detail later.

The I/O unit 83 is a human-machine interface for a user of the RFID reader 80. Specifically, a keypad, a microphone, a speaker, or the like can be used. The control unit 81 receives an input of the user through the I/O unit 83 and provides provided information to the user.

The network communication unit 84 includes an antenna, and is configured so as to communicate with a base station device in a mobile communication system. The control unit 81 communicates with the network server device 90 through the network communication unit 84 to receive provided information.

The RFID communication unit 85 transmits radio waves to the RFIDs 70 to thereby read data stored in the RFIDs 70. Then, the RFID communication unit 85 outputs the read data to the control unit 81.

Hereinafter, functions of the control unit 81 will be described in detail.

In a case where the RFID reader 80 is carried by a person, the RFID communication unit 85 periodically reads data stored in the RFID 70 installed at a place where the person is (specifically in a range where radio waves can be transmitted/received between the RFID communication unit 85 and the RFID 70). When the person moves, the RFIDs 70 installed on a moving route are read along with the movement of the person. In FIG. 12, in a case where the RFID reader 80 moves along the moving route 100, the RFID communication unit 85 reads data which are respectively stored in an RFID 70-1, an RFID 70-2, an RFID 70-3, an RFID 70-4, and an RFID 70-5 in the stated order. The RFID communication unit 85 outputs those read data to the identification information acquisition unit 810.

The identification information acquisition unit 810 acquires identification information of the RFIDs 70 from the input data. As a result, the identification information acquisition unit 810 recognizes the RFIDs 70 capable of transmitting/receiving radio waves among the RFIDs 70 installed at a plurality of locations. The identification information acquisition unit 810 outputs the recognized identification information of the RFID 70 to the storage unit 82 and the RFID series acquisition unit 812.

The storage unit 82 stores the identification information-related information in correlation with the identification information of the RFID 70 input from the identification information acquisition unit 810. Hereinafter, this point will be described.

First, each information constituting the identification information-related information will be described.

A successive acquisition time refers to a time period during which the RFID 70 input from the identification information acquisition unit 810 has been identified. The identification information acquisition unit 810 acquires a time when the RFID 70 starts to be recognized and a time when the RFID 70 becomes unrecognizable with respect to each RFID 70 recognized, thereby acquiring a difference therebetween as the successive acquisition time. For example, if the RFID 70 is recognized for 100 seconds, the successive acquisition time is 100 seconds.

Provided information-provided information is information indicating that the provided information has been provided to the user by the control unit 81. When the provided information is provided to the user, the control unit 81 acquires the provided information-provided information.

The payment information is information indicating that some payment procedure has been taken by the user. If the RFID reader 80 has an electronic money function, the payment information acquisition unit 811 acquires the payment information when the payment by electronic money is made. If the RFID reader 80 does not have an electronic money function, the payment information acquisition unit 811 acquires the payment information which indicates that the payment has been made by the input of the user.

The adjacent identification information is information indicating RFIDs 70 installed at locations adjacent to the locations where RFIDs 70 are installed. The non-acquisition time is a time required for movement between two RFIDs 70 installed at adjacent locations (time during which both RFIDs 70 are not recognized during movement). In a case where a certain RFID 70 (e.g., RFID 70-1) has become unrecognizable, the identification information acquisition unit 810 acquires identification information of a subsequently recognized RFID 70 (e.g., RFID 70-2) as the adjacent identification information of the RFID 70-1, and acquires a time when the RFID 70-1 becomes unrecognizable and a time when the RFID 70-2 starts to be recognized, thereby acquiring a difference therebetween as the non-acquisition time with regard to those RFIDs 70.

Figure 14:
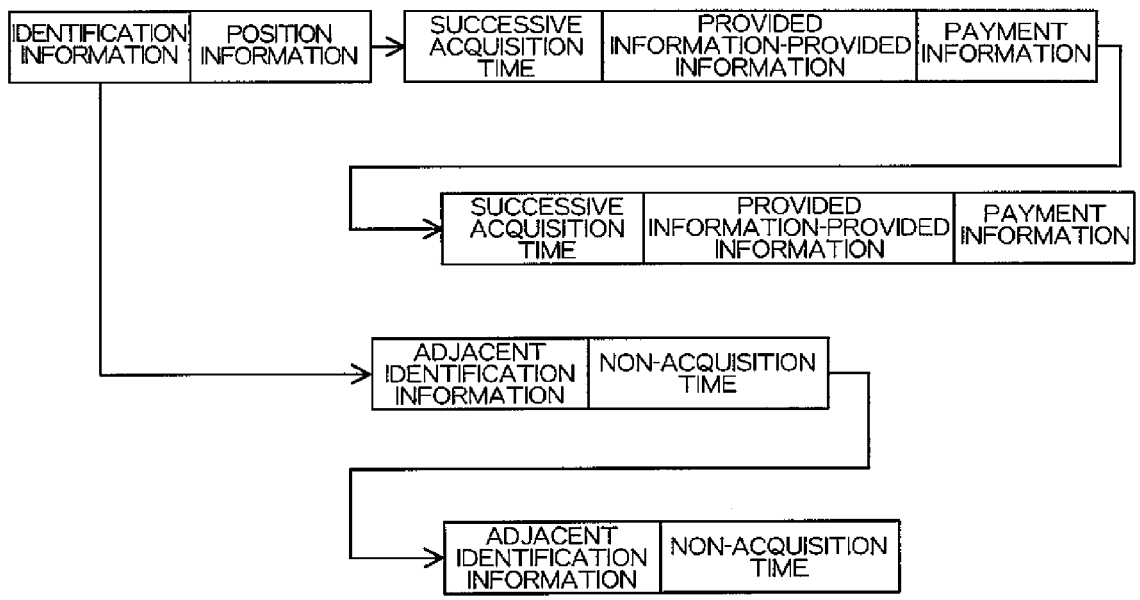
FIG. 14 is a diagram showing a memory structure for storing identification information-related information according to the second embodiment of the present invention.

FIG. 14 is a diagram showing a memory structure of the storage unit 82 for storing the above-mentioned identification information-related information. As shown in the figure, the storage unit 82 stores each identification information-related information with identification information of each RFID 70 being a key. Hereinafter, the point will be described in detail.

The storage unit 82 stores the successive acquisition time, the provided information-provided information, and the payment information as a set. Specifically, in a case where the control unit 81 has provided the provided information to a user while a certain RFID 70 is recognized, the storage unit 82 stores the provided information-provided information as well as the successive acquisition time. In a case where the payment information acquisition unit 811 has acquired the payment information 103 while a certain RFID 70 is recognized, the storage unit 82 stores the payment information as well as the successive acquisition time.

Further, the storage unit 82 stores the adjacent identification information and the non-acquisition time as a set. Specifically, the storage unit 82 stores the adjacent identification information regarding the certain RFID 70 and the non-acquisition time indicating a time period after a certain RFID 70 has become unrecognizable until an RFID 70 indicated by the adjacent identification information starts to be recognized.

It should be noted that in a case where there are a plurality of the above-mentioned sets, the storage unit 82 stores all the sets.

Hereinafter, the identification information-related information will be described in detail with a specific example.

Figure 15:
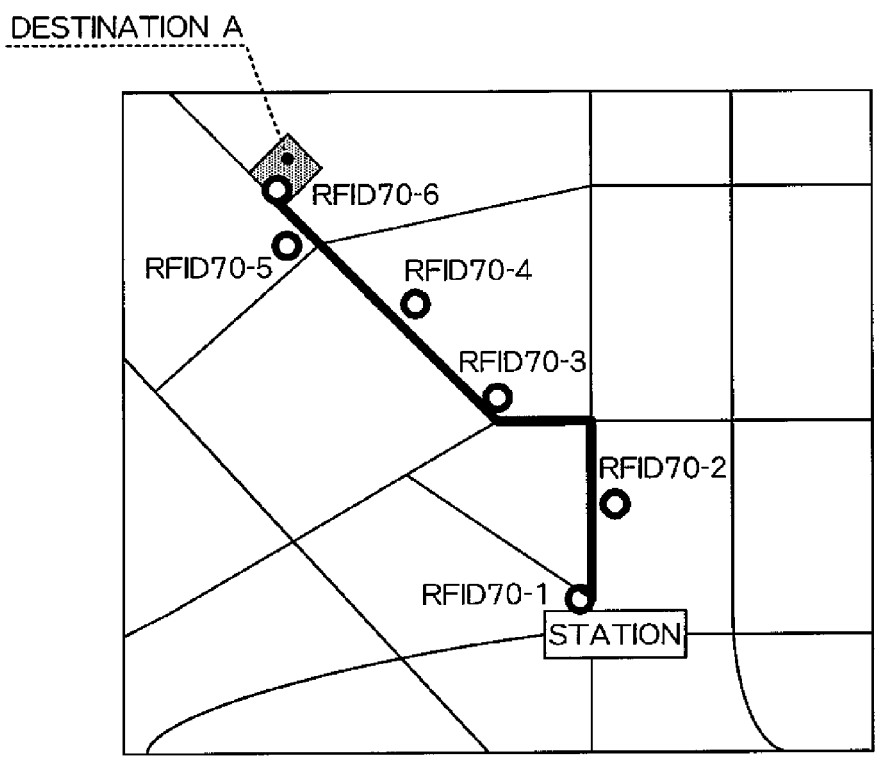
FIG. 15 is a diagram for showing on a map a moving route of a user wearing the RFID reader according to the second embodiment of the present invention.
Figure 16:
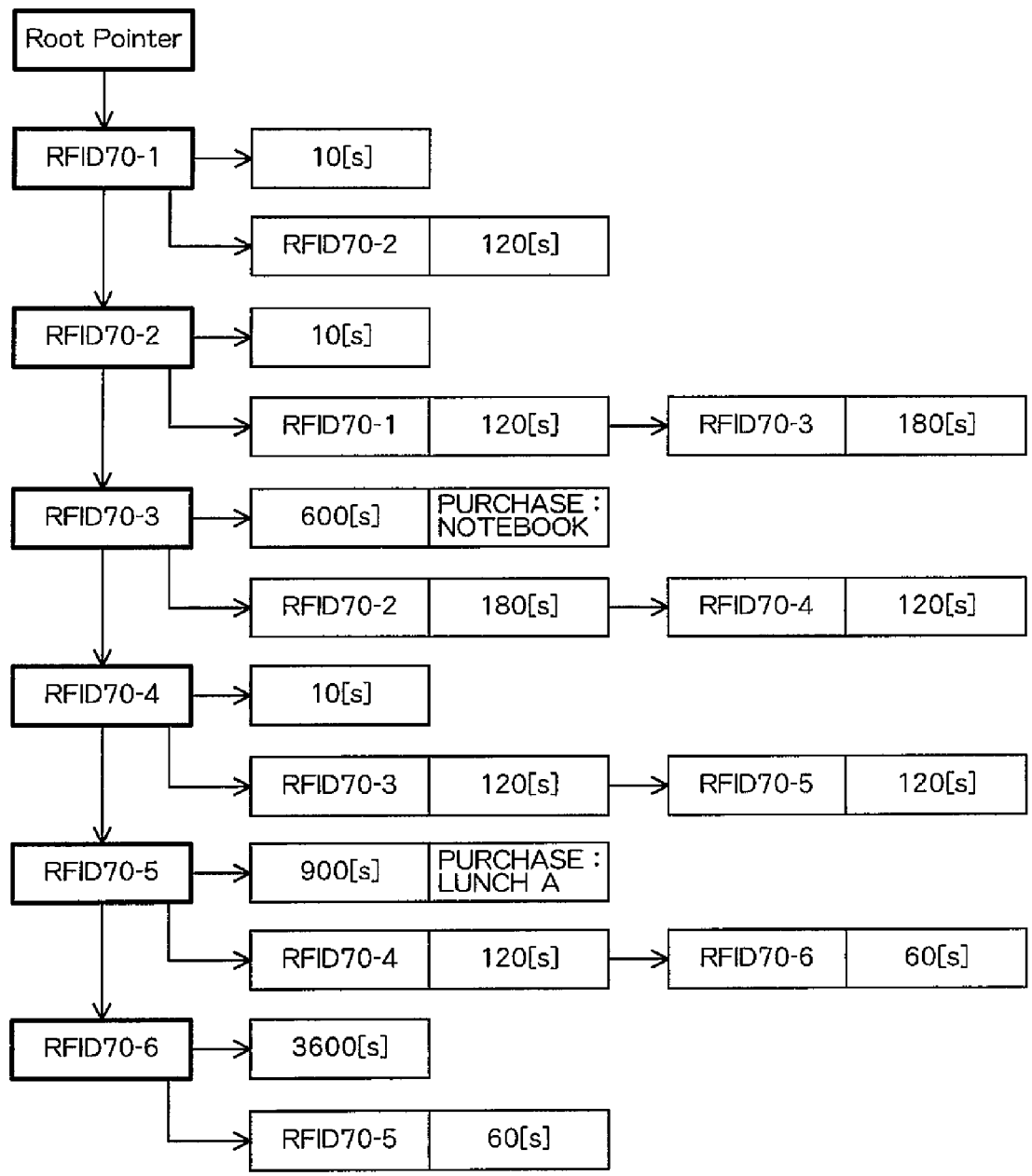
FIG. 16 is a diagram showing the identification information-related information stored according to the second embodiment of the present invention.

FIG. 15 is a diagram showing a moving route of a user wearing the RFID reader 80 on a map. In the figure, the user walks toward a destination A from a station along the route indicated by the thick line of the figure. FIG. 16 shows a specific example of identification information-related information stored in the storage unit 82 at this time.

First, the RFID 70-1 is installed at the station, and when the user enters the station, the RFID reader 80 recognizes the RFID 70-1. Then the storage unit 82 stores identification information indicating the recognized RFID 70-1.

It should be noted that the storage unit 82 preferably obtains position information of the RFID 70-1 at this time and stores the obtained position information together with the identification information of the RFID 70-1. Specifically, it is preferable that the RFID reader 80 be mounted with a GPS receiver and the storage unit 82 store a position of the GPS receiver determined based on radio waves received from the GPS satellite at the time of recognition of the RFID 70-1 as the position information of the RFID 70-1. The same is applied to the other RFIDs 70 described later.

The identification information acquisition unit 810 acquires the time when the RFID 70-1 starts to be recognized as well as the time when the RFID 70-1 becomes unrecognizable. Then the identification information acquisition unit 810 acquires a difference therebetween as a successive acquisition time of the RFID 70-1. The storage unit 82 stores the successive acquisition time of the RFID 70-1 thus acquired in correlation with the RFID 70-1. In FIG. 16, the successive acquisition time is 10 seconds. The same also applies to the other RFIDs 70 described later.

As the user moves, the RFID 70-1 becomes unrecognized. As the user continuously moves, the RFID 70-2 is recognized before long. The storage unit 82 stores identification information indicating the RFIDs 70 successively recognized as described above as adjacent identification information for each other.

Further, the identification information acquisition unit 810 acquires the time when the RFID 70-1 becomes unrecognizable as well as the time when the RFID 70-2 starts to be recognized. Then, the identification information acquisition unit 810 acquires a difference therebetween as a non-acquisition time during when the user moves from the RFID 70-1 to the RFID 70-2. The storage unit 82 stores the non-acquisition time thus acquired together with the adjacent identification information indicating the RFID 70-2 with respect to the RFID 70-1, or together with the adjacent identification information indicating the RFID 70-1 with respect to the RFID 70-2. In FIG. 16, the non-acquisition time is 120 seconds.

Hereinafter, storage of the identification information-related information by the storage unit 82 is continued in the same manner until the user arrives at the destination A. However, during a time when the RFIDs 70 are recognized in the midst of the way, there may be cases where the provided information-provided information and the payment information are acquired. In this case, the storage unit 82 stores those information in correlation with the identification information of the RFID 70. FIG. 16 shows that payment information indicating that the user has purchased a notebook during when the RFID 70-3 is recognized is stored, and payment information indicating that the user has purchased a lunch A during when the RFID 70-5 is recognized is stored.

Figure 17:
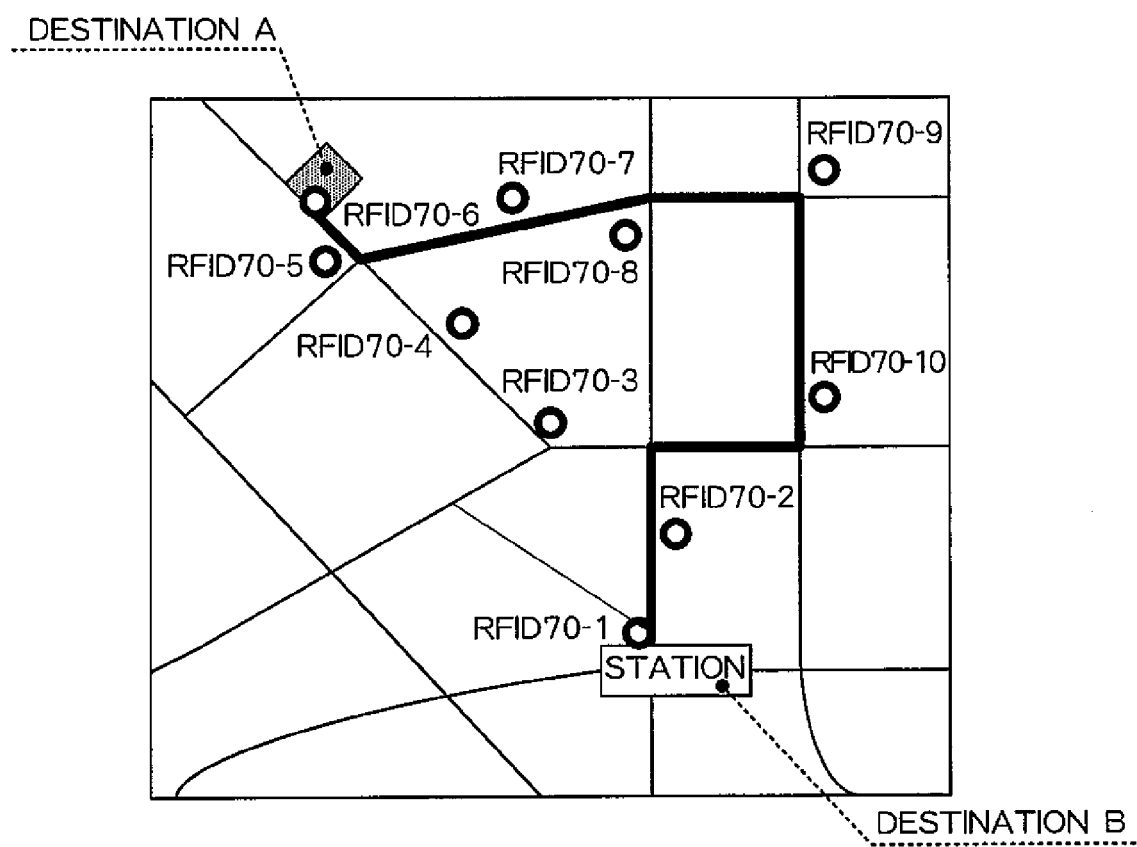
FIG. 17 is a diagram for showing on the map a moving route of the user wearing the RFID reader according to the second embodiment of the present invention.

Similar to FIG. 15, FIG. 17 is a diagram showing the moving route of the user wearing the RFID reader 80 on a map. FIG. 15 continues to FIG. 17. After arriving at the destination A, the user walks toward the station as a destination B along the route indicated by the thick line of the figure.

Figure 18:
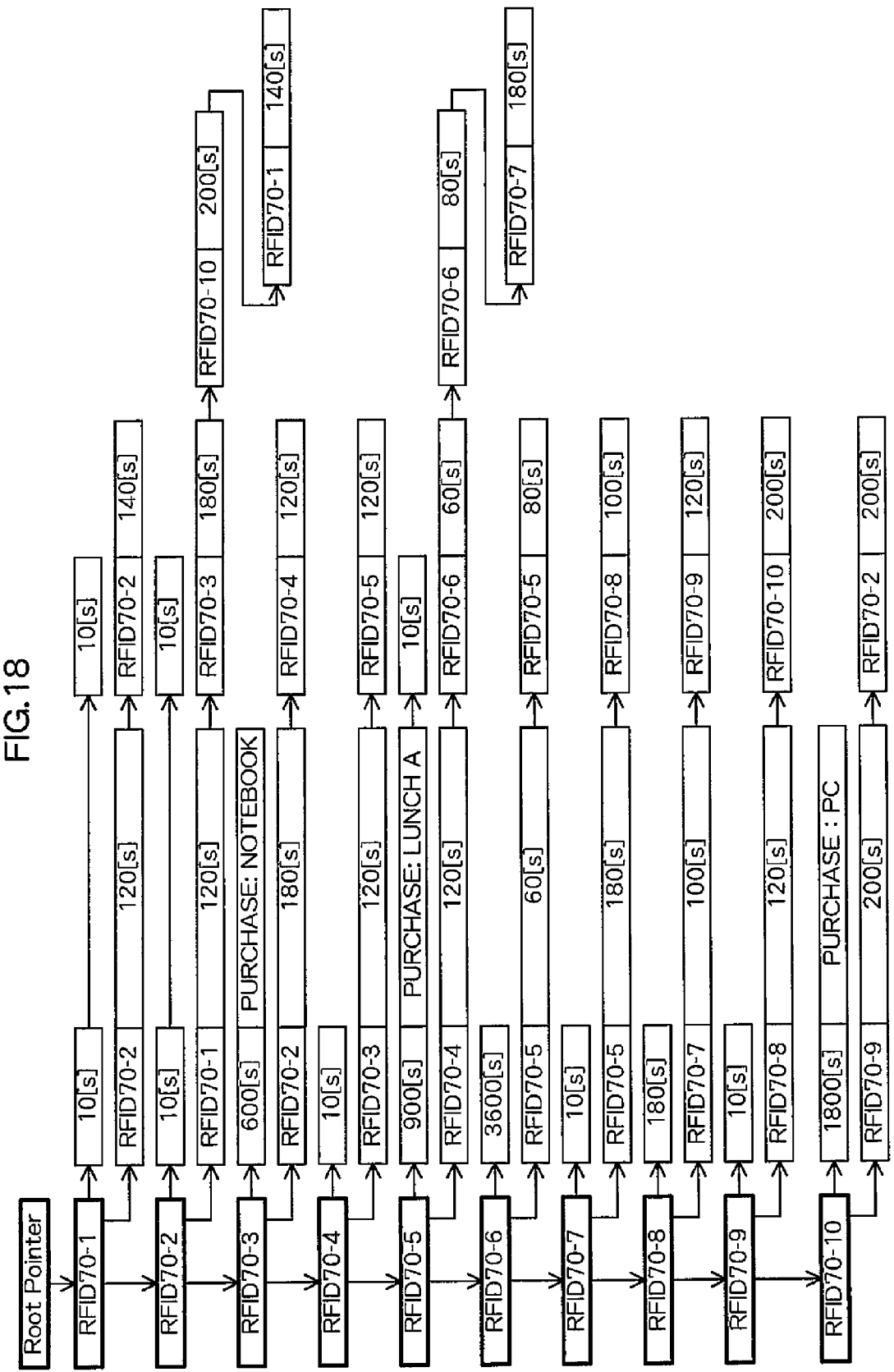
FIG. 18 is a diagram showing the identification information-related information stored according to the second embodiment of the present invention.

FIG. 18 shows a specific example of the identification information-related information stored in the storage unit 82 at this time. FIG. 18 shows identification information-related information stored while the user has walked along the route shown in FIG. 17 as well as the identification information-related information (identification information-related information shown in FIG. 16) stored while the user has walked along the route shown in FIG. 15. Thus, as the user moves, an amount of the identification information-related information stored in the storage unit 82 increases.

As described above, the storage unit 82 stores the identification information-related information in correlation with identification information of each RFID 70.

The destination acquisition unit 813 acquires schedule information indicating a schedule of the user. Accordingly, it is preferable that the RFID 70 receive an input of the schedule information by the user and store the input schedule information in the storage unit 82. Then the destination acquisition unit 813 acquires destination identification information for identifying the RFID 70 installed at the destination of the user based on the schedule information.

Figures 19, 20:
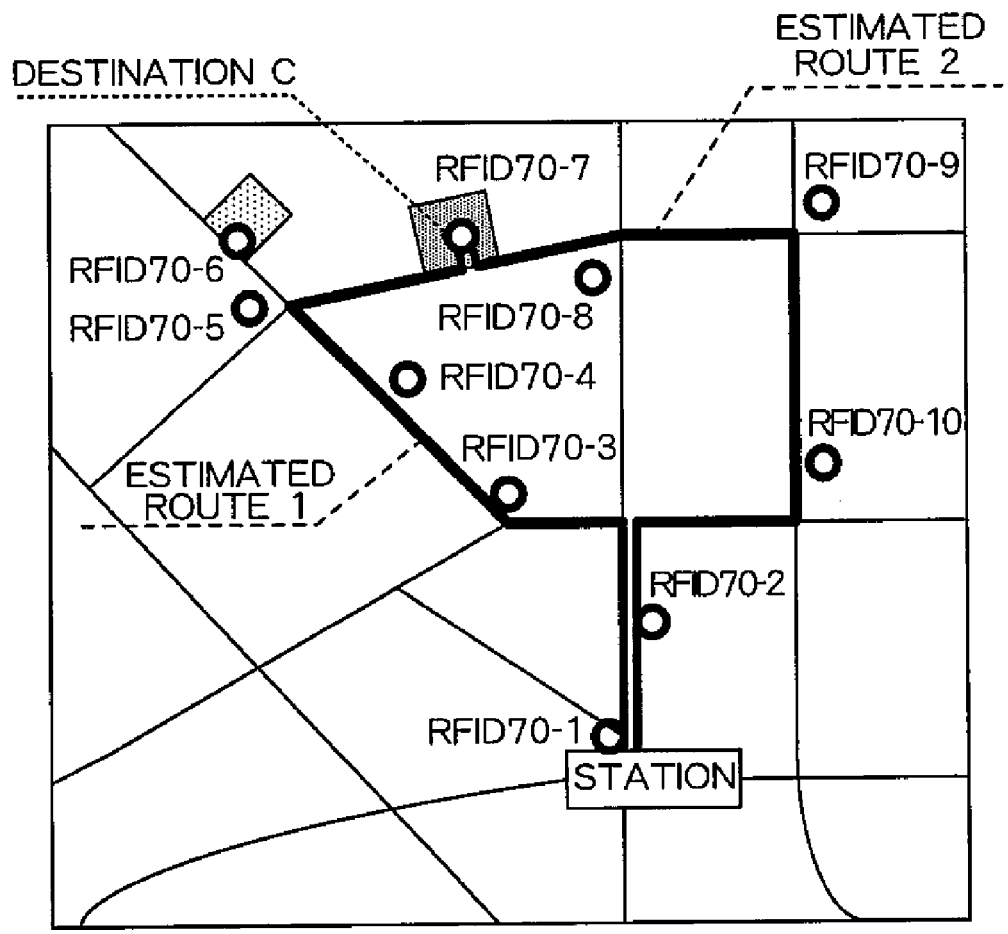
FIG. 19 is a diagram showing schedule information according to the second embodiment of the present invention.
FIG. 20 is an explanatory diagram of RFID series acquisition processing according to the second embodiment of the present invention.

FIG. 19 shows a specific example of the schedule information. The schedule information is created for each schedule. As shown in FIG. 19, the schedule information contains date and time when the schedule is to be executed, contents of the schedule, a place (destination) where the schedule is to be executed, and a route to the place. The destination acquisition unit 813 acquires the destination identification information based on the destination contained in the schedule information, and position information stored in the storage unit 82 in correlation with the identification information of each RFID 70. Specifically, it is preferable that the storage unit 82 store the position information indicating the position of the destination in correlation with the destination, and the destination acquisition unit 813 acquire the identification information indicating each RFID 70 having position information matching the position information on the destination or a difference between the position information and the position information on the destination being within a predetermined range as the destination identification information.

The RFID series acquisition unit 812 acquires a plurality of RFID series containing a plurality of identification information indicating the route along which the user moves from the current position to the destination based on the RFID currently recognized, the RFID indicated by the destination identification information, and the adjacent identification information stored in the storage unit 82.

Figure 21:
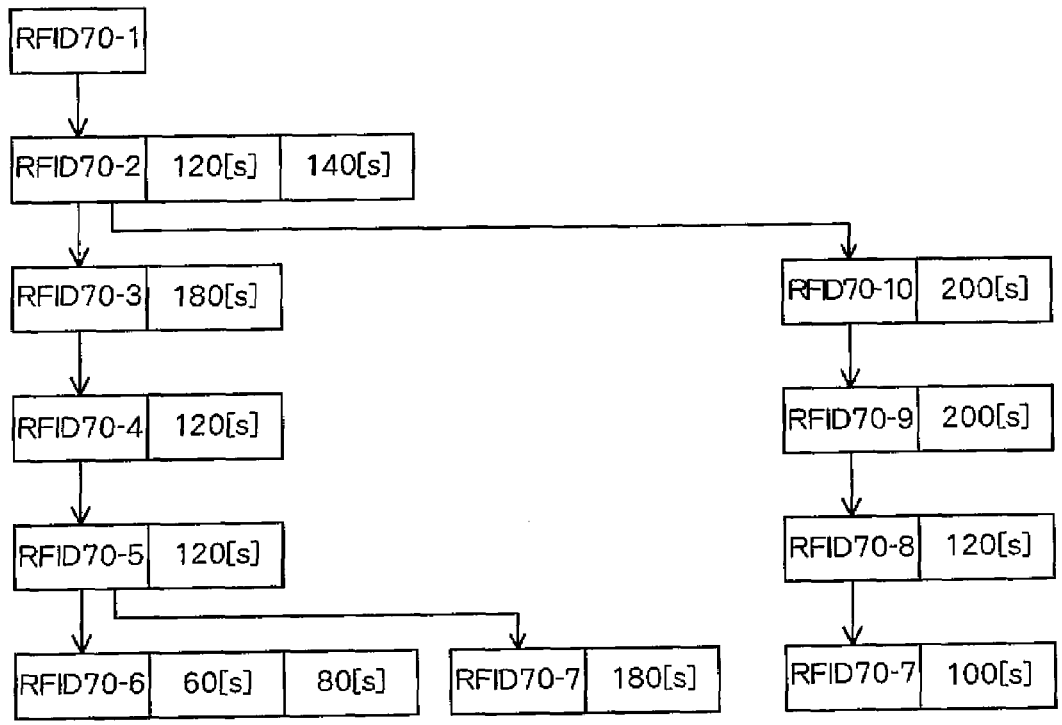
FIG. 21 is an explanatory diagram of the RFID series acquisition processing according to the second embodiment of the present invention.

Referring to specific examples shown in FIGS. 20 and 21, processing of acquisition of the RFID series by the RFID series acquisition unit 812 will be described. In FIGS. 20 and 21, a description is made of the processing of acquisition of the RFID series by the RFID series acquisition unit 812 in a case where the user moves from the station to the destination C in a state where the identification information-related information shown in FIG. 18 is already stored in the storage unit 82.

When the user enters the station, the RFID reader 80 first recognizes the RFID 70-1. When the RFID 70 already stored in the storage unit 82 is recognized, the RFID series acquisition unit 812 starts the processing for acquisition of the RFID series. In this regard, since the RFID 70-1 has already been stored in the storage unit 82, the RFID series acquisition unit 812 starts acquisition of the RFID series.

First, the RFID series acquisition unit 812 acquires the destination identification information from the destination acquisition unit 813. Here, description follows assuming that the destination identification information indicating the destination C (identification information indicating RFID 70-7) has been acquired based on the schedule information shown in FIG. 19.

Next, the RFID series acquisition unit 812 acquires a plurality of RFID series composed of a plurality of identification information indicating a route of the user from the RFID 70-1 installed at the current position to the RFID 70-7 installed at the destination C (in this case, estimated route 1 and estimated route 2 shown in FIG. 20). Referring to FIG. 21, the processing for acquisition of the RFID series will be described in detail.

First, the RFID series acquisition unit 812 acquires each identification information of RFIDs 70 installed at locations adjacent to the location at which the RFID 70-1 currently recognized is installed, based on the adjacent identification information of the RFID 70-1 stored in the storage unit 82. In this case, only identification information of the RFID 70-2 is acquired.

Next, the RFID series acquisition unit 812 acquires identification information of RFIDs 70 installed at locations adjacent to the location at which the RFID 70-2 is installed based on the adjacent identification information of the RFID 70-2 stored in the storage unit 82. In this case, two identification information of an RFID 70-3 and an RFID 70-10 are acquired.

After that, the RFID series acquisition unit 812 continues the similar processing until the identification information of the RFID 70-7 installed at the destination C is eventually acquired. In an RFID series (RFID 70-1, RFID 70-2, RFID 70-3, RFID 70-4, and RFID 70-5) shown on the left side of FIG. 21, each identification information of an RFID 70-6 and an RFID 70-7 is acquired subsequent to the RFID 70-5. Since the identification information of the RFID 70-7 is acquired, the RFID series acquisition unit 812 ends the acquisition processing of the RFID series, and determines one RFID series (RFID 70-1, RFID 70-2, RFID 70-3, RFID 70-4, RFID 70-5, and RFID 70-7). This RFID series indicates the estimated route 1 shown in FIG. 20. In an RFID series (RFID 70-1, RFID 70-2, RFID 70-10, RFID 70-9, and RFID 70-8) shown on the right side of FIG. 21, identification information of the RFID 70-7 is acquired subsequent to the RFID 70-8. Since, the identification information of the RFID 70-7 is acquired, the RFID series acquisition unit 812 ends the processing of acquisition of the RFID series, and determines one RFID series (RFID 70-1, RFID 70-2, RFID 70-10, RFID 70-9, RFID 70-8, and RFID 70-7). This RFID series indicates the estimated route 2 shown in FIG. 20.

As described above, the RFID series acquisition unit 812 acquires a plurality of RFID series.

The provided information acquisition unit 814 reads provided information from the server device 90 which correlates the identification information identifying each RFID 70 with the provided information and stores them, and provides the read provided information to the user through the I/O unit 83. In this embodiment, the provided information acquisition unit 814 acquires each provided information stored in the server device 90 by correlating the provided information with identification information indicating at least a part of the RFIDs 70 among a plurality of RFIDs 70 respectively included in a plurality of RFID series. Specifically, the provided information acquisition unit 814 transmits the identification information indicating at least a part of the RFIDs 70 to the server device 90, to thereby receive the provided information stored in correlation with the identification information from the server device 90.

The RFID specifying unit 815 specifies each RFID 70 which becomes an acquisition target of the provided information. Specifically, among the RFIDs 70 contained in the RFID series acquired by the RFID series acquisition unit 812, each RFID 70 storing payment information or provided information-provided information is preferably specified as an acquisition target of the provided information.

It should be noted that the RFID specifying unit 815 causes the vicinal RFID specifying unit 816 to specify RFIDs 70 (vicinal RFIDs 70) located in the vicinity of the RFIDs 70 contained in the RFID series based on the non-acquisition time stored in the storage unit 82. Also, the RFID 70 thus specified may be specified as an acquisition target of the provided information. In this case, it is preferable that the vicinal RFID specifying unit 816 calculate each moving time from each RFID 70 contained in the RFID series based on the non-acquisition time stored in the storage unit 82 with respect to each RFID 70 stored in the storage unit 82, and specify an RFID 70 whose calculated moving time is smaller than a predetermined value as the vicinal RFID 70.

Further, when acquiring each provided information with respect to the plurality of RFIDs 70 specified by the RFID specifying unit 815, the provided information acquisition unit 814 determines an order of priority to thereby acquire each provided information in the order of priority. For this reason, the arrival time acquisition unit 817 acquires a time required for the user to reach the destination using the route indicated by the RFID series and a time required for the user to reach at least a part of RFIDs 70 (RFID 70 specified by the RFID specifying unit 815) among the plurality of RFIDs 70 contained in the RFID series respectively, with respect to the plurality of RFID series.

The provided information acquisition unit 814 determines the order of priority based on the times acquired by the arrival time acquisition unit 817, and determines the RFID 70 whose provided information is to be acquired among the plurality of RFIDs 70 respectively included in the RFID series according to the determined order of priority. In other words, the provided information acquisition unit 814 determines to acquire the provided information with respect to the RFID 70 with the highest order of priority. Upon completion of the acquisition, the provided information acquisition unit 814 determines to acquire the provided information with respect to the RFID 70 with the second highest order of priority.

Referring again to FIG. 21, the order of priority will be described in detail. Here, description will be made assuming that RFIDs 70 that specified by the RFID specifying unit 815 are RFIDs 70 storing payment information, that is, the RFID 70-3, the RFID 70-5, and the RFID 70-10.

The arrival time acquisition unit 817 sums up the non-acquisition times stored during the movement among the RFIDs 70 contained in the RFID series, that is, from the RFID 70 installed at the current position to the above-mentioned specified RFIDs 70, to thereby calculate each time described above. For example, a time required for the user to reach the RFID 70-7 installed at the destination is represented as 120 sec.+180 sec.+120 sec.+120 sec.+180 sec.=720 sec. according to the RFID series on the left side of the figure. According to the RFID series on the right side, the time is represented as 120 sec.+200 sec.+200 sec.+120 sec.+100 sec.=740 sec. Note that herein, in a case where a plurality of non-acquisition times are stored with respect to one movement section, smaller non-acquisition times are selected to be used for the calculation.

Through the similar calculation, a time required for the user to reach the RFID 70-3 is 300 seconds (only the RFID series on the left side), a time required for the user to reach the RFID 70-5 is 540 seconds (only the RFID series on the left side), and a time required for the user to reach the RFID 70-10 is 320 seconds (only the RFID series on the right side). Hereinafter, the time required for the user to reach the RFID 70 installed at the destination is referred to as "destination arrival time", and the time required for the user to reach the RFIDs 70 specified by the RFID specifying unit 815 is referred to as "specified RFID arrival time".

The provided information acquisition unit 814 calculates a total time of a destination arrival time (destination arrival time on a route indicated by the RFID series containing the RFIDs 70) and a specified RFID arrival time with respect to each RFID 70 specified by the RFID specifying unit 815. For example, a total time with respect to the RFID 70-3 is 1020 seconds, a total time with respect to the RFID 70-5 is 1260 seconds, and a total time with respect to the RFID 70-10 is 1060 seconds.

Then the provided information acquisition unit 814 determines an order of priority for acquiring each provided information in an ascending order of the total times thus calculated. In the above-mentioned example, each provided information is acquired in the stated order of the RFID 70-3, the RFID 70-10, and the RFID 70-5 in a descending order of priority.

Figure 22:
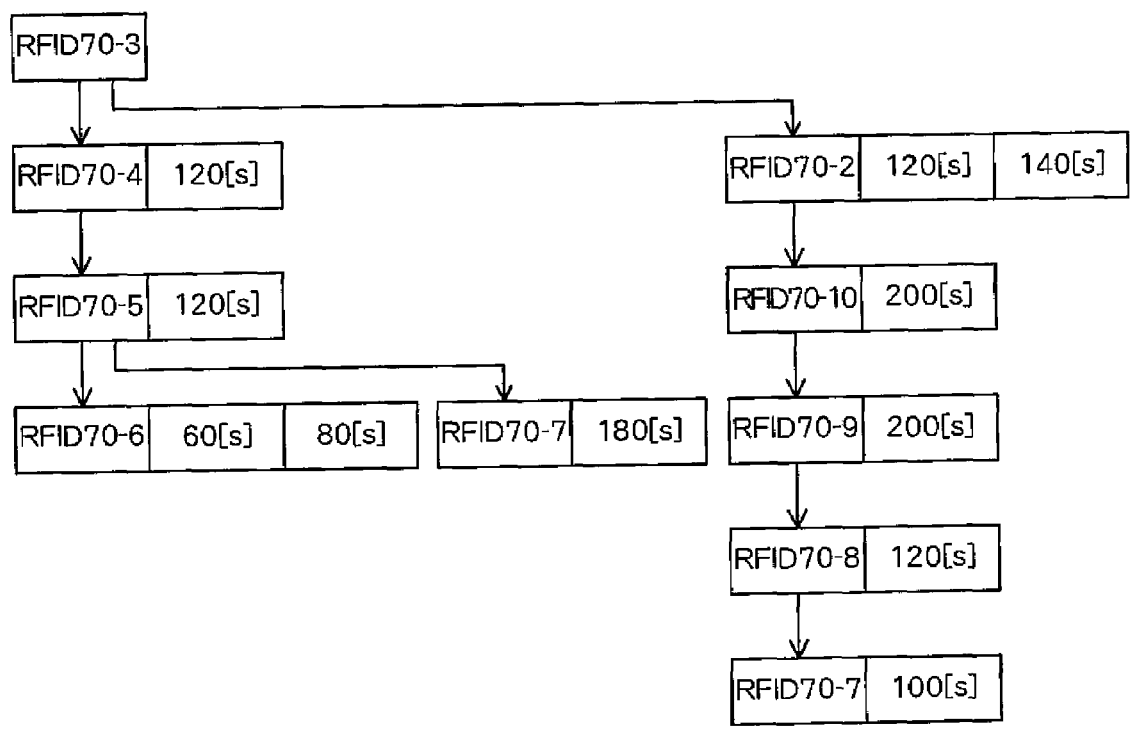
FIG. 22 is an explanatory diagram of the RFID series acquisition processing according to the second embodiment of the present invention.
Figure 23:
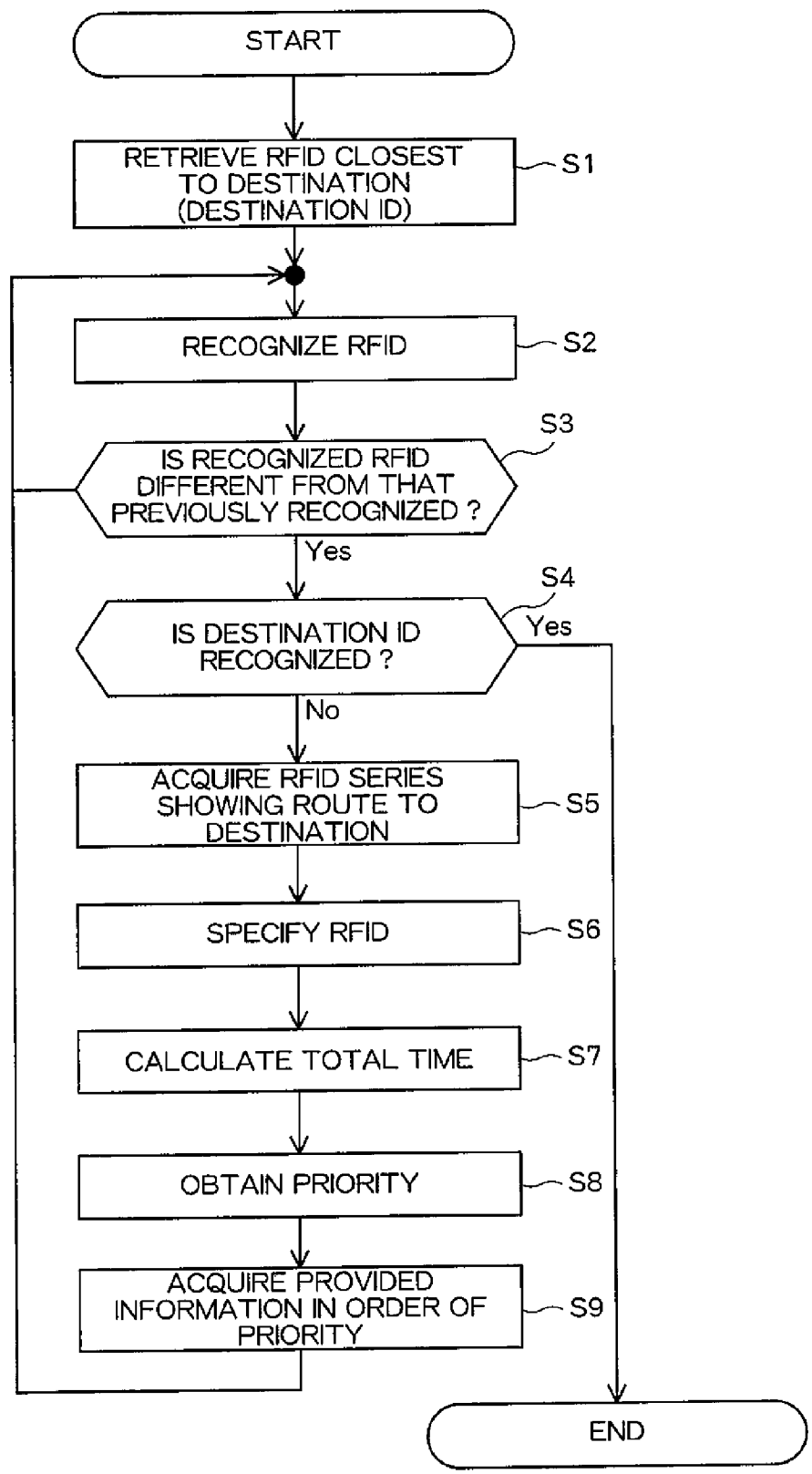
FIG. 23 is a flowchart of processing of the RFID reader according to the second embodiment of the present invention.

It should be noted that when the RFID 70-3 can be recognized by the movement of the user, the RFID series acquisition unit 812 acquires an RFID series again. As a result, the RFID series shown in FIG. 22 is acquired. The provided information acquisition unit 814 calculates a total time again according to the RFID series. As a result, a total time with respect to the RFID 70-3 is 420 seconds, a total time with respect to the RFID 70-5 is 660 seconds, and a total time with respect to the RFID 70-10 is 1060 seconds.

In this case, it is desirable that the RFID 70-3 for which the provided information has already been acquired be excluded from a target of the priority order determination. If the provided information of the RFID 70-3 has already been acquired in this case, the provided information acquisition unit 814 determines the order of priority such that each provided information is acquired from the RFID 70-5 and the RFID 70-10 in the stated order as a descending order of priority. In this case, with the movement of the user, the order of priority of the RFID 70-10 and the RFID 70-5 is replaced with each other as compared with that initially determined.

As a result of the above-mentioned determination of the order of priority and acquisition of provided information, the RFID reader 80 can estimate movement of the user and acquire provided information in advance.

The above-mentioned processing will be described again in detail with reference to the flowchart of the processing of the RFID reader 80.

The RFID reader 80 first searches for an RFID 70 closest to the destination (hereinafter, referred to as "destination ID") and acquires destination identification information (S1). The search is performed based on the position information stored in the storage unit 82 as described above.

Then upon recognition of the RFID 70 (S2), the RFID reader 80 judges whether or not the RFID 70 is an RFID 70 different from that having been recognized (S3). In a case where the RFID 70 is the same as that having been recognized, the processing returns to the processing of S2. In other words, the RFID reader 80 stands by until the RFID 70 different from that having been recognized is recognized.

Upon recognition of the RFID 70 different from that having been recognition, the RFID reader 80 judges whether or not the destination ID is recognized (whether or not the destination ID is contained in the recognized RFID 70) (S4). If the destination ID is recognized, the processing is completed. If not, the RFID reader 80 acquires an RFID series showing a route to the destination (S5).

Upon acquisition of the RFID series, the RFID reader 80 specifies RFIDs 70 for which provided information is to be acquired (S6). Then each total time is calculated with respect to each RFID 70 (S7), and obtains the order of priority for acquisition of provided information based on each calculated total time (S8). The RFID reader 80 acquires provided information from the server device 90 in the order of priority thus obtained (S9).

According to the above-mentioned RFID reader 80, through acquisition of the RFID series, it is possible to estimate a route along which the user moves and to further acquire the provided information with respect to locations for which provided information is to be acquired among locations on the route in advance.

Further, the RFID reader 80 acquires provided information based on a time required for reaching the destination and a time required for reaching each location for which provided information is to be acquired, which makes it possible to acquire each provided information in the order of necessity.

Further, the RFID reader 80 can acquire in advance each provided information for locations at which the user may come by even when the locations are not on the route.

Further, the RFID reader 80 can update adjacent data carrier identification information successively along with the movement of the user. In addition, the RFID reader 80 can acquire destination data carrier identification information based on the schedule of the user.

It should be noted that the present invention is not limited to the above-mentioned embodiments. For example, information storage destination information may be stored in correlation with identification information of each RFID 70. As a result, it becomes possible to obtain information not only from the server device 90 but also from information storage destinations different for each RFID 70. Further, information update date and time information may be stored in correlation with identification information of each RFID 70. As a result, in acquiring provided information, it is possible to first confirm the updated date and time of the provided information to thereby avoid acquiring the same provided information twice.

The invention claimed is:

1. A reader device which is carried by a user and includes a carrier identification information reader unit for reading carrier identification information from a data carrier for identifying the data carrier, which is in a non-contact state from the carrier identification information reader unit, comprising:
    a reading time counting unit for counting a number of times that carrier identification information is read by the carrier identification information reader unit;
    a user correlation unit for selecting at least one carrier identification information from carrier identification information read by the carrier identification information reader unit, according to the number of times counted by the reading time counting unit, and for correlating the selected carrier identification information with the user;
    a home correlation unit that correlates carrier identification information read by the carrier identification information reader unit with a home of the user based on whether the carrier identification information is read from a data carrier identified as a fixed data carrier and based on the number of times counted by the reading time counting unit, wherein the reader unit judges that the user is not out when the carrier identification information correlated with the home of the user is acquired;

a reader position acquisition unit that acquires a change of position of the user; and an aboard judgment unit that judges whether a user is in a vehicle based on the change of position of the user acquired by the reader position acquisition unit and based on whether carrier identification information is read from a data carrier identified as a moving data carrier.

2. The reader device according to claim 1, further comprising a storage unit for storing a data carrier to be transported or worn, wherein the user correlation unit selects at least one carrier identification information from the carrier identification information read by the carrier identification information reader unit and used for identifying the data carrier stored in the storage unit as the data carrier to be transported or worn, according to the number of times counted by the reading time counting unit.

3. The reader device according to claim 1, further comprising:

a carrier identification information acquisition unit for acquiring information selected based on the carrier identification information correlated with the user by the user correlation unit; and an information output unit for outputting the information acquired by the carrier identification information acquisition unit.

4. The reader device according to claim 1, further comprising an information transmission unit for transmitting the carrier identification information correlated with the user by the user correlation unit to another device.

5. The reader device according to claim 1, further comprising a carrier identification information storage unit for storing one or a plurality of carrier identification information, wherein the user correlation unit avoids the selection when the one or the plurality of carrier identification information stored in the carrier identification information storage unit has/have been read by the carrier identification information reader unit.

6. The reader device according to claim 5, wherein:

the carrier identification information storage unit stores a data carrier as a fixed data carrier; and the carrier identification information stored in the carrier identification information storage unit is the carrier identification information correlated with the home of the user by the home correlation unit.

7. The reader device according to claim 1, further comprising a moving speed acquisition unit for acquiring a moving speed of the reader device, wherein the user correlation unit avoids the selection when the moving speed is equal to or higher than a predetermined speed.

8. The reader device according to claim 1, wherein the carrier identification information reader unit periodically reads carrier identification information from the data carrier, and the reading time counting unit adds 1 to the number of times for the carrier identification information in a case that the carrier identification information reader unit reads the data carrier identification information read at last period.

9. The reader device according to claim 1, wherein the carrier identification information reader unit carried by the user reads all the carrier identification information of all data carriers within a vicinity automatically.

* * * * *